*US009958171B2*

United States Patent
Takayama et al.

(10) Patent No.: US 9,958,171 B2
(45) Date of Patent: May 1, 2018

(54) AIR-CONDITIONING APPARATUS

(75) Inventors: Keisuke Takayama, Tokyo (JP);
Osamu Morimoto, Tokyo (JP);
Daisuke Shimamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 715 days.

(21) Appl. No.: 14/387,610

(22) PCT Filed: Mar. 27, 2012

(86) PCT No.: PCT/JP2012/002096
§ 371 (c)(1),
(2), (4) Date: Sep. 24, 2014

(87) PCT Pub. No.: WO2013/144994
PCT Pub. Date: Oct. 3, 2013

(65) Prior Publication Data
US 2015/0034293 A1 Feb. 5, 2015

(51) Int. Cl.
*F24F 3/06* (2006.01)
*F25B 13/00* (2006.01)
(Continued)

(52) U.S. Cl.
CPC .............. *F24F 3/065* (2013.01); *F24D 5/12* (2013.01); *F24D 19/1087* (2013.01); *F24F 3/08* (2013.01);
(Continued)

(58) Field of Classification Search
CPC .............. F24F 3/065; F24F 2011/0046; F25B 2341/0661; F25B 2600/2513; F25B 2313/0231; F25B 2313/0233
(Continued)

(56) References Cited

U.S. PATENT DOCUMENTS 5,046,323 A * 9/1991 Kuwahara ............... F24F 3/065
62/140
5,279,131 A * 1/1994 Urushihata ............. F24F 3/065
62/117
(Continued)

FOREIGN PATENT DOCUMENTS

JP 61-110833 A 5/1986
JP 62-141163 U 9/1987
(Continued)

OTHER PUBLICATIONS

Office Action dated Dec. 8, 2015 issued in corresponding JP patent application No. 2014-506989 (and English translation).
(Continued)

*Primary Examiner* — David Teitelbaum
*Assistant Examiner* — Nelson Nieves
(74) *Attorney, Agent, or Firm* — Posz Law Group, PLC

(57) ABSTRACT

An air-conditioning apparatus according to the present invention includes at least indoor heat exchangers. In response to a request to increase heat exchange performance from the indoor heat exchanger, the air-conditioning apparatus decreases a heat exchange capacity of an outdoor heat exchanger and controls an opening degree of an expansion valve corresponding to the indoor heat exchanger to decrease a flow rate of a refrigerant that flows through the indoor heat exchanger.

20 Claims, 10 Drawing Sheets

(51) Int. Cl.

| | | |
|---|---|---|
| *F24D 5/12* | (2006.01) | |
| *F24D 19/10* | (2006.01) | |
| *F24F 3/08* | (2006.01) | |
| *F24F 5/00* | (2006.01) | |
| *F24F 11/00* | (2018.01) | |
| *F25B 25/00* | (2006.01) | |
| *F25B 49/02* | (2006.01) | |
| *F25B 41/04* | (2006.01) | |

(52) U.S. Cl.
 CPC ............ *F24F 5/001* (2013.01); *F24F 11/001* (2013.01); *F24F 11/008* (2013.01); *F25B 13/00* (2013.01); *F25B 25/005* (2013.01); *F25B 41/04* (2013.01); *F25B 49/02* (2013.01); *F25B 2313/0231* (2013.01); *F25B 2400/13* (2013.01); *F25B 2600/13* (2013.01); *F25B 2600/2513* (2013.01); *F25B 2600/2519* (2013.01); *Y02B 30/745* (2013.01)

(58) Field of Classification Search
 USPC .................................. 62/204, 222, 224, 225
 See application file for complete search history.

(56) References Cited

U.S. PATENT DOCUMENTS

| | | | | |
|---|---|---|---|---|
| 5,317,907 | A * | 6/1994 | Shimizu ................... | F24F 3/065 62/176.6 |
| 5,343,935 | A * | 9/1994 | Sumitani ................. | F24F 3/065 165/207 |
| 5,737,931 | A * | 4/1998 | Ueno ....................... | F25B 9/006 62/126 |
| 5,823,006 | A * | 10/1998 | Jung ........................ | F24F 3/065 62/291 |
| 6,415,619 | B1 * | 7/2002 | Bash ........................ | F25B 5/02 257/E23.098 |
| 2003/0230107 | A1 * | 12/2003 | Lee ......................... | F25B 13/00 62/324.6 |
| 2004/0050083 | A1 * | 3/2004 | Yuasa ...................... | F25B 5/00 62/222 |
| 2004/0138784 | A1 * | 7/2004 | Park ........................ | F24F 3/065 700/277 |
| 2006/0123815 | A1 * | 6/2006 | Kim ........................ | F24F 3/065 62/200 |
| 2007/0137225 | A1 * | 6/2007 | Shindo .................... | F24F 3/065 62/160 |
| 2008/0022710 | A1 * | 1/2008 | Jeong ...................... | F25B 13/00 62/324.6 |
| 2008/0196432 | A1 * | 8/2008 | Shimamoto ............. | F24F 3/065 62/238.7 |
| 2009/0145151 | A1 * | 6/2009 | Wakamoto .............. | F25B 9/008 62/259.1 |
| 2010/0043467 | A1 * | 2/2010 | Kawano .................. | F25B 13/00 62/129 |
| 2010/0139312 | A1 * | 6/2010 | Takegami ............... | F25B 13/00 62/498 |
| 2010/0199695 | A1 * | 8/2010 | Shinozaki ................ | F24F 1/26 62/238.7 |
| 2010/0229587 | A1 * | 9/2010 | Liu ......................... | F24F 3/065 62/335 |
| 2010/0281895 | A1 * | 11/2010 | Okamoto ................ | F24F 3/065 62/160 |
| 2010/0282434 | A1 * | 11/2010 | Yabuuchi ............ | F24D 11/0235 165/63 |
| 2011/0023534 | A1 * | 2/2011 | Kasahara ................ | F25B 13/00 62/498 |
| 2011/0061413 | A1 * | 3/2011 | Setoguchi ............... | F24F 3/065 62/238.7 |
| 2011/0088421 | A1 * | 4/2011 | Wakamoto .............. | F25B 13/00 62/238.7 |
| 2011/0174002 | A1 * | 7/2011 | Jang ........................ | F25B 13/00 62/115 |
| 2011/0219804 | A1 * | 9/2011 | Park ........................ | F24F 1/26 62/259.1 |
| 2011/0232311 | A1 * | 9/2011 | Korenaga ............... | F24F 3/065 62/222 |
| 2012/0043056 | A1 * | 2/2012 | Shimazu ................. | F24F 3/065 165/96 |
| 2012/0291472 | A1 * | 11/2012 | Morimoto ............... | F24F 3/065 62/324.6 |

FOREIGN PATENT DOCUMENTS

| | | |
|---|---|---|
| JP | 02-217738 A | 8/1990 |
| JP | 02-279962 A | 11/1990 |
| JP | 04-110573 A | 4/1992 |
| JP | 08-291952 A | 11/1996 |
| JP | 08-320158 A | 12/1996 |
| JP | 2002-317996 A | 10/2002 |
| JP | 2007-271112 A | 10/2007 |
| WO | 2011/099067 A1 | 8/2011 |

OTHER PUBLICATIONS

Extended European Search Report dated Oct. 30, 2015 in the corresponding EP application No. 12873137.9.
Office Action dated May 7, 2015 issued in corresponding JP patent application No. 2014-506989 (and English translation).
International Search Report of the International Searching Authority dated Jun. 26, 2012 for the corresponding international application No. PCT/JP2012/002096 (and English translation).

* cited by examiner

← FLOW OF REFRIGERANT DURING HEATING ONLY OPERATION AND HEATING MAIN OPERATION
←···· FLOW OF REFRIGERANT DURING COOLING ONLY OPERATION AND COOLING MAIN OPERATION

← FLOW OF REFRIGERANT DURING HEATING ONLY OPERATION AND HEATING MAIN OPERATION
←···· FLOW OF REFRIGERANT DURING COOLING ONLY OPERATION AND COOLING MAIN OPERATION

← FLOW OF REFRIGERANT DURING HEATING MAIN OPERATION

- ← FLOW OF REFRIGERANT DURING HEATING ONLY OPERATION (INCLUDING WATER HEATING MODE)
- ← FLOW OF REFRIGERANT DURING COOLING ONLY OPERATION (INCLUDING WATER COOLING MODE)
- ← FLOW OF HEAT MEDIUM

AIR-CONDITIONING APPARATUS

CROSS REFERENCE TO RELATED APPLICATION

This application is a U.S. national stage application of International Application No. PCT/JP2012/002096 filed on Mar. 27, 2012, the disclosure of which is incorporated by reference.

TECHNICAL FIELD

The present invention relates to a multi-room air-conditioning apparatus used as, for example, a multi-air-conditioning apparatus for a building or the like.

BACKGROUND ART

Generally used air-conditioning apparatuses having a multi-room heat-pump refrigeration cycle include an outdoor unit including a compressor, a four-way valve, and an outdoor heat exchanger, and a plurality of indoor units each including an expansion valve and an indoor heat exchanger (use side heat exchanger). These components sequentially communicate with one another through refrigerant pipes, and form a heat-pump refrigeration cycle. Specifically, the indoor units have a parallel configuration, and form a certain refrigeration cycle by switching between a cooling operation and a heating operation. Also, there are multi-room air-conditioning apparatuses capable of simultaneously performing a cooling operation and a heating operation.

Such multi-room air-conditioning apparatuses adjust a flow rate of the refrigerant in the entire refrigeration cycle by adjusting an operation capacity of the compressor using a condensing temperature of the indoor heat exchangers as a target value in the case of the heating operation. Also, each of the indoor units adjusts a flow rate of the refrigerant in the indoor heat exchanger by adjusting an opening degree of the expansion valve using a degree of subcooling of the indoor heat exchanger as a target value. That is, a capacity of the indoor heat exchanger is designed such that a certain heating performance is achieved for a load of the indoor unit by adjusting a condensing pressure and a degree of subcooling within predetermined ranges in the case of the heating operation. In the case of the cooling operation, an evaporating pressure and a degree of superheat are adjusted within predetermined ranges.

Also, in the case where a multi-room air-conditioning apparatus capable of performing a simultaneous cooling and heating operation performs the simultaneous cooling and heating operation, during a cooling main operation in which the load of the cooling operation is large in terms of a load ratio between the load of the cooling operation and the load of the heating operation of the indoor units, the outdoor heat exchanger functions as a condenser in general. An amount of heat transferred in the outdoor heat exchanger is adjusted using, as a target value, the condensing temperature of the indoor heat exchanger of the indoor unit that is performing the heating operation.

Also, there has been proposed an air-conditioning apparatus including a controller that detects an operation mode of each of a plurality of indoor units and a difference between a temperature set in the indoor unit and a corresponding room temperature, determines an operation state of the entire air-conditioning apparatus using such information, and controls a capacity of a compressor and an amount of heat exchanged in an outdoor heat exchanger (see, for example, Patent Literature 1). When the largest value (MAX$\Delta$TjH) among $\Delta$Tj each representing a difference between a temperature set in a corresponding heating indoor unit and a temperature of sucked air is larger than an upper limit value $\alpha$ of a control target range in a cooling main operation mode, this air-conditioning apparatus determines that there is a unit whose performance is insufficient among the heating indoor units, and outputs a value obtained by subtracting $\Delta$ffan from a current command value ffan of the rotation speed of an outdoor fan as a new command value ffan* to the outdoor fan. That is, when $\Delta$Tj of the indoor unit having the largest load among the heating indoor units is larger than the upper limit value $\alpha$, the rotation speed of the outdoor fan is decreased.

In addition, as for air-conditioning apparatuses including a plurality of indoor units installed in the same room, there has been proposed an air-conditioning apparatus that performs an air-conditioning performance saving operation in any of the indoor units in the case where a detected air-conditioning load of a refrigerant circuit is larger than a heating performance rating preset for the refrigerant circuit (see, for example, Patent Literature 2). This air-conditioning apparatus determines whether a capacity of a compressor has reached the maximum capacity during the heating operation. Upon determining that the capacity of the compressor has reached the maximum value, the air-conditioning apparatus determines whether the performance of the entire system is sufficient or not for a heating load on the basis of a value obtained by subtracting a calculated high-pressure saturation temperature from a high-pressure saturation temperature target value. If the performance of the entire system seems to be insufficient, the air-conditioning apparatus changes a set degree-of-subcooling target value to a larger value in the order of ascending priority to perform a heating performance saving operation. In the case of the cooling operation, a set degree-of-superheat target value is changed to a larger value.

CITATION LIST

Patent Literature

Patent Literature 1: Japanese Unexamined Patent Application Publication No. 2-217738 (for example, page 6)
Patent Literature 2: Japanese Unexamined Patent Application Publication No. 2007-271112 (for example, pages 5 and 6)

SUMMARY OF INVENTION

Technical Problem

In the conventional air-conditioning apparatus described in Patent Literature 1, the amount of heat exchanged in the outdoor heat exchanger is controlled based on the indoor unit having the largest load among the heating indoor units. This thus involves a problem that the performance of the heating indoor unit having a small load also increases because the performance of all the heating indoor units increases.

In the conventional air-conditioning apparatus described in Patent Literature 1, when the condensing temperature (high-pressure saturation temperature) of an indoor unit is lower than the target value, control is performed such that the condensing temperature becomes closer to the target value by decreasing the flow rate of the refrigerant in an indoor unit assigned low priority. This is performance control for allowing an indoor unit assigned high priority to achieve the performance within the designed capacity. That is, this performance control allows the indoor unit assigned high priority to achieve the air-conditioning performance set before the control but does not allow it to achieve the performance over the designed capacity.

Also, in the conventional air-conditioning apparatus, the heating performance of an indoor unit assigned high priority is increased by adjusting a pressure reducing device that controls the flow rate of the refrigerant in an indoor unit assigned low priority. This, however, involves a problem that the heating performance of the indoor unit cannot be made higher than performance of the designed capacity by just adjusting the pressure reducing device. Further, when an attempt is made to make the heating performance higher than performance of the designed capacity by just adjusting a pressure reducing device that controls the flow rate of the refrigerant in the indoor unit assigned high priority to increase the flow rate of the refrigerant in the indoor unit assigned high priority, such an attempt decreases the degree of subcooling of the refrigerant of the indoor unit and causes a problem that control of the flow rate of the refrigerant becomes difficult.

That is, in multi-room air-conditioning apparatuses capable of performing a simultaneous cooling and heating operation, the heating performance of an indoor unit assigned the high priority cannot be made higher than performance of the designed capacity by just increasing the flow rate of the refrigerant with the pressure reducing device. Moreover, in such multi-room air-conditioning apparatuses, an attempt to make the heating performance of the indoor unit assigned high priority higher than performance of the designed capacity through control of the pressure reducing device causes another problem that control of the flow rate of the refrigerant becomes difficult.

There has also hitherto been proposed an air-conditioning apparatus including a plurality of intermediate heat exchangers that allow heat exchange between, for example, a refrigerant and a heat medium such as water and heat or cool the heat medium, and an indirect indoor heat exchanger that circulates the heat medium therethrough to heat or cool an indoor space. In such an air-conditioning apparatus, in the case where a heating load of the indirect indoor unit is sufficiently large in a water-cooling and water-heating mixed mode in which some of the intermediate heat exchangers function as condensers and some of the rest of them function as evaporators, heat transfer areas of the intermediate heat exchangers that function as condensers are small for the heating load. For this reason, the heat medium cannot be sufficiently heated for the heating load by just adjusting adjustment of the condensing temperature with an expansion device. Also, there is a problem that a flow rate of the heat medium sent out by a pump that sends out the heat medium related to heating becomes insufficient and the heating performance of the indirect indoor unit decreases.

The present invention has been made to solve at least one of the above-described problems, and aims to provide an air-conditioning apparatus capable of making, in response to a performance increase request from at least one of use side heat exchangers, performance of the use side heat exchanger that has made the performance increase request higher than that of the designed capacity.

Solution to Problem

An air-conditioning apparatus according to the present invention includes a compressor configured to compress a refrigerant, a plurality of use side heat exchangers each configured to function as a condenser or an evaporator, a plurality of expansion devices each provided for a corresponding one of the use side heat exchangers, and each configured to adjust a flow rate of the refrigerant that flows through the corresponding use side heat exchanger, a heat source side heat exchanger configured to function as a condenser or an evaporator, and a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein during an operation in which at least one of the plurality of use side heat exchangers functions as a condenser and rest of the use side heat exchangers function as evaporators, in response to a request to increase heat exchange performance from a first use side heat exchanger among the plurality of use side heat exchangers, the first use side heat exchanger being the at least one some of the use side heat exchangers that is operating in an operation mode identical to an operation mode of the heat source side heat exchanger, the controller decreases the heat exchange capacity of the heat source side heat exchanger by changing a value of the saturation temperature target value of the heat source side heat exchanger, and controls the opening degree of the expansion device corresponding to a second use side heat exchanger to decrease a flow rate of the refrigerant that flows through the second use side heat exchanger, the second use side heat exchanger being one of the use side heat exchangers other than the first use side heat exchanger and being at least one of the use side heat exchangers that are operating in an operation mode identical to the operation mode of the first use side heat exchanger.

Advantageous Effects of Invention

In response to a performance increase request from the first use side heat exchanger during a simultaneous cooling and heating operation, the air-conditioning apparatus according to the present invention makes the heat exchange capacity of the heat source side heat exchanger smaller than usual and decreases the flow rate of the refrigerant in the second use side heat exchanger, and thus is capable of more effectively increasing performance of the first use side heat exchanger. Therefore, with the air-conditioning apparatus according to the present invention, the performance of the first use side heat exchanger can be made higher than that of the designed capacity and also the performance of the second use side heat exchanger can be prevented from becoming excessive.

DESCRIPTION OF EMBODIMENTS

Embodiment 1

Figure 1:
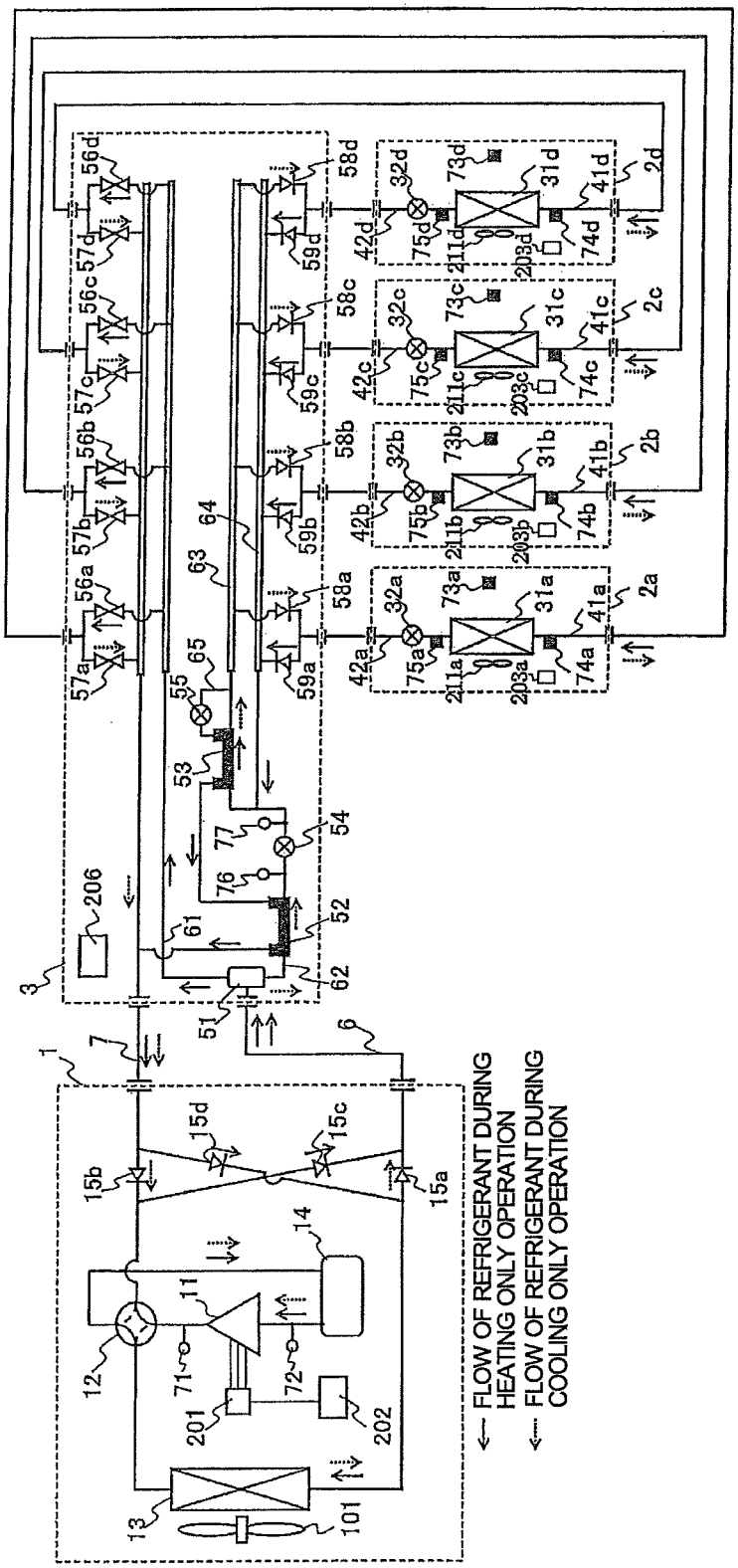
FIG. 1 is a refrigerant circuit diagram of an air-conditioning apparatus according to Embodiment 1 of the present invention.

FIG. 1 is a refrigerant circuit diagram of an air-conditioning apparatus according to Embodiment 1 of the present invention. Note that, in the following description, a letter of alphabet may be appended to the end of a reference sign in the case where components having the same configuration have to be distinguished from one another or the like. The air-conditioning apparatus according to Embodiment 1 is capable of selecting an operation mode individually for each of indoor units, that is, performing a simultaneous cooling and heating operation. In FIG. 1, solid-line arrows represent a flow of a refrigerant during a heating only operation and dotted-line arrows represent a flow of the refrigerant during a cooling only operation.

During a simultaneous cooling and heating operation, the air-conditioning apparatus according to Embodiment 1 decreases a heat exchange capacity of an outdoor heat exchanger 13 so as to increase performance of at least one of indoor heat exchangers 31 that are operating in the same operation mode as the outdoor heat exchanger 13, and adjusts expansion valves 32 of the other indoor heat exchangers 31 that are operating in the same mode so as to decrease the flow rate of the refrigerant and consequently suppress performance from becoming excessive.

The air-conditioning apparatus according to Embodiment 1 includes a compressor 11, a four-way valve 12 serving as a refrigerant flow switching device, the outdoor heat exchanger 13 serving as a heat source side heat exchanger, an accumulator 14, check valves 15, 58, and 59, a gas-liquid separator 51, internal heat exchangers 52 and 53, the plurality of indoor heat exchangers 31 serving as use side heat exchangers, the plurality of expansion valves 32 (expansion devices) each provided for a corresponding one of the indoor heat exchangers 31, expansion valves 54 and 55, solenoid valves 56 and 57 serving as opening and closing devices, which are connected by pipes to form a refrigeration cycle.

In the air-conditioning apparatus according to Embodiment 1, the compressor 11, the four-way valve 12, the outdoor heat exchanger 13, the accumulator 14, and the check valves 15a, 15b, 15c, and 15d are included in an outdoor unit 1 serving as a heat source unit. The outdoor unit 1 also includes an outdoor controller 202 that administrates control of the outdoor unit 1 and control of the entire air-conditioning apparatus. In the air-conditioning apparatus according to Embodiment 1, the indoor heat exchanger 31 and the expansion valve 32 are included in each indoor unit 2. Also, the air-conditioning apparatus according to Embodiment 1 includes a relay unit 3 provided between the outdoor unit 1 and the indoor units 2.

This relay unit 3 includes the gas-liquid separator 51, the internal heat exchangers 52 and 53, the expansion valves 54 and 55, the solenoid valves 56 and 57 serving as opening and closing devices, the check valves 58 and 59, pressure sensors 76 and 77, and a relay unit controller 206. The relay unit 3 is connected to the outdoor unit 1 by a high-pressure pipe 6 and a low-pressure pipe 7 serving as refrigerant pipes. Also, the indoor units 2 are connected to the relay unit 3 in parallel with one another by gas branch pipes 41 and liquid branch pipes 42 which are refrigerant pipes. Each of these indoor units 2 includes an indoor controller 203 that controls the indoor unit 2.

Note that there may be any given number of indoor units 2 and any given number of relay units 3. Also, the outdoor controller 202, the indoor controller 203, and the relay unit controller 206 will be described in FIG. 2.

The compressor 11 is configured to compress a sucked refrigerant and discharge (send out) the compressed refrigerant. The four-way valve 12 serving as a refrigerant flow switching device is provided at a discharge side of the compressor 11 and is configured to switch a passage of the refrigerant. Note that the four-way valve 12 performs valve switching based on operation modes related to cooling and heating in accordance with an instruction from the outdoor controller 202 which will be described later. In Embodiment 1, the refrigerant passage is switched depending on a cooling only operation, a cooling main operation, a heating only operation, and a heating main operation.

The outdoor heat exchanger 13 includes, for example, heat transfer pipes allowing the refrigerant to pass therethrough, a fin (not illustrated) for increasing a heat transfer area between the refrigerant flowing through the heat transfer pipes and outside air, and a fan 101 (air-sending device) that blows air. The outdoor heat exchanger 13 allows heat exchange between the refrigerant and air (outside air). For example, the outdoor heat exchanger 13 functions as an evaporator during a heating only operation and a heating main operation to evaporate and gasify (vaporize) the refrigerant. On the other hand, during a cooling only operation and a cooling main operation, the outdoor heat exchanger 13 functions as a condenser or gas cooler (hereinafter, referred to as a condenser) to condense and liquefy the refrigerant. In some circumstances, the outdoor heat exchanger 13 makes the refrigerant into a two-phase mixture of liquid and gas (two-phase gas-liquid refrigerant) instead of completely gasifying or liquefying the refrigerant. Examples of the configuration of the outdoor heat exchanger 13 will be described in FIG. 3 and FIG. 4.

The indoor heat exchanger 31 includes, for example, heat transfer pipes allowing the refrigerant to pass therethrough, a fin (not illustrated) for increasing a heat transfer area between the refrigerant flowing through the heat transfer pipes and outside air, and a fan (not illustrated) that blows air. The indoor heat exchanger 31 allows heat exchange between the refrigerant and air (indoor). For example, the indoor heat exchanger 31 functions as a condenser or gas cooler (hereinafter, referred to as a condenser) during a heating operation to condense and liquefy the refrigerant.

On the other hand, during a cooling operation, the indoor heat exchanger 31 functions as an evaporator to evaporate and gasify the refrigerant. In some circumstances, the indoor heat exchanger 31 makes the refrigerant into a two-phase mixture of liquid and gas (two-phase gas-liquid refrigerant) instead of completely gasifying or liquefying the refrigerant.

The expansion valve 32, for example, an electronic expansion value or the like, reduces the pressure of the refrigerant by adjusting the flow rate of the refrigerant. The accumulator 14 has functions for storing excessive refrigerant within the refrigeration cycle circuit and for preventing a large amount of liquid refrigerant from returning to the compressor 11 to damage the compressor 11.

The air-conditioning apparatus according to Embodiment 1 also includes various pressure sensors and temperature sensors.

A pressure sensor 71 serving as refrigerant pressure detection means is installed between the discharge side of the compressor 11 and the four-way valve 12, and detects a discharge pressure (pressure of the refrigerant discharged by the compressor 11). A pressure sensor 72 is installed between the accumulator 14 and the compressor 11, and detects a suction pressure (pressure of the refrigerant sucked by the compressor 11). The pressure sensor 76 detects a high pressure (pressure at an inlet side of the expansion valve 54). The pressure sensor 77 detects an intermediate pressure (pressure at an outlet side of the expansion valve 54, that is, a pressure between the high pressure and a low pressure). Note that the pressure sensor 71, the pressure sensor 72, the pressure sensor 76, and the pressure sensor 77 may be installed at any given positions where they can detect the discharge pressure of the compressor 11, the suction pressure of the compressor 11, the high pressure, and the intermediate pressure, respectively, and their installation positions are not limited to the illustrated ones.

Each of temperature sensors 74 serving as refrigerant temperature detection means is installed at the corresponding gas branch pipe 41 of the corresponding indoor unit 2, and detects a temperature at a gas side of the indoor heat exchanger 31. Each of temperature sensors 75 is installed between the corresponding indoor heat exchanger 31 and the corresponding expansion valve 32 of the corresponding indoor unit 2, and detects a temperature at a liquid side of the indoor heat exchanger 31. Each of temperature sensors 73 detects a temperature of air sucked by the corresponding indoor heat exchanger 31 (in other words, the corresponding indoor unit 2).

The check valve 15a is provided between the outdoor heat exchanger 13 and the high-pressure pipe 6, and allows the refrigerant to pass only in a direction from the outdoor heat exchanger 13 to the high-pressure pipe 6. The check valve 15b is provided between the low-pressure pipe 7 and the four-way valve 12, and allows the refrigerant to pass only in a direction from the low-pressure pipe 7 to the four-way valve 12. The check valve 15c is provided between the four-way valve 12 and the high-pressure pipe 6, and allows the refrigerant to pass only in a direction from the four-way valve 12 to the high-pressure pipe 6. The check valve 15d is provided between the low-pressure pipe 7 and the outdoor heat exchanger 13, and allows the refrigerant to pass only in a direction from the low-pressure pipe 7 to the outdoor heat exchanger 13.

Each solenoid valve 56 and each solenoid valve 57 connect the corresponding gas branch pipe 41 of the corresponding indoor unit 2 to a high-pressure gas pipe 61 and the low-pressure pipe 7, respectively, in a switching manner. When the solenoid valve 56 is opened and the solenoid valve 57 is closed, the gas branch pipe 41 is connected to the high-pressure gas pipe 61. When the solenoid valve 57 is opened and the solenoid valve 56 is closed, the gas branch pipe 41 is connected to the low-pressure pipe 7.

One end of each check valve 58 and one end of each check valve 59 are connected to the corresponding liquid branch pipe 42 in a reverse-parallel relationship. The other end of each check valve 58 is connected to a liquid pipe 63, and allows the refrigerant to pass only in a direction from the liquid pipe 63 to the liquid branch pipe 42. The other end of each check valve 59 is connected to a liquid pipe 64, and allows the refrigerant to pass only in a direction from the liquid branch pipe 42 to the liquid pipe 64.

The gas-liquid separator 51 separates gas and liquid from each other when a two-phase gas-liquid refrigerant flows thereto from the high-pressure pipe 6, and allows the gas refrigerant to flow through the high-pressure gas pipe 61 and the liquid refrigerant through a liquid pipe 62.

The expansion valve 54 is provided between the gas-liquid separator 51 and the liquid pipes 63 and 64. A bypass pipe 65 connects the liquid pipe 63 and the low-pressure pipe 7 to each other. The expansion valve 55 is provided in the middle of the bypass pipe 65. The internal heat exchanger 53 allows heat exchange between a downstream portion of the expansion valve 55 of the bypass pipe 65 and a pipe that extends from the expansion valve 54 to the liquid pipe 63. On the other hand, the internal heat exchanger 52 allows heat exchange between a downstream portion of the internal heat exchanger 53 of the bypass pipe 65 and a pipe connecting the gas-liquid separator 51 to the expansion valve 54.

The relay unit controller 206 controls (gives commands for) adjustment of opening degrees of the expansion valves 54 and 55 and opening and closing of the solenoid valves 56 and 57.

Figure 2:
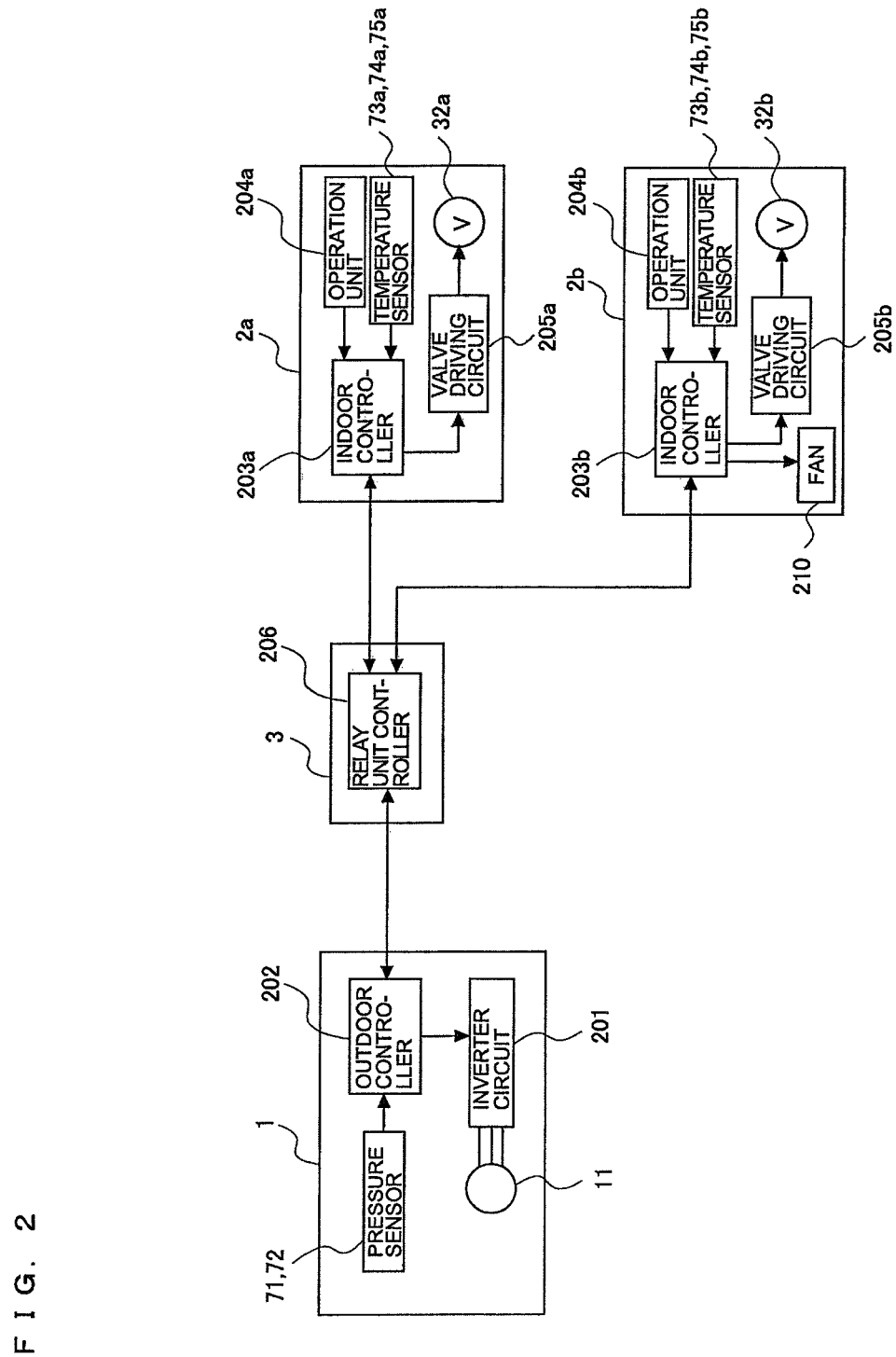
FIG. 2 is a control circuit diagram of the air-conditioning apparatus according to Embodiment 1 of the present invention.

FIG. 2 is a control circuit diagram of the air-conditioning apparatus according to Embodiment 1 of the present invention. As illustrated in FIG. 2, an inverter circuit 201 is connected to the outdoor controller 202. This outdoor controller 202 includes a microcomputer and peripheral circuits of the microcomputer. Also, the inverter circuit 201 is configured to output an alternating-current power of an operation frequency (and voltage) corresponding to a command from the outdoor controller 202 to a motor of the compressor 11. Note that the outdoor controller 202 decides the operation frequency (that is, the rotation speed of the compressor 11) of a command given to the inverter circuit 201, in accordance with detected pressures detected by the pressure sensors 71 and 72.

Each of the indoor controllers 203 is connected to a valve driving circuit 205. This indoor controller 203 includes a microcomputer and peripheral circuits of the microcomputer, and communicates with the outdoor controller 202 via the relay unit controller 206. Also, the valve driving circuit 205 is configured to set the opening degree of the expansion valve 32 in accordance with a command from the indoor controller 203. The indoor controller 203 decides the opening degree of the expansion valve 32 in accordance with content of a request from an operation unit 204 and temperatures detected by the temperature sensors 73 to 75. Details regarding this determination method will be described later. The indoor controller 203 also controls the rotation speed of the fan 211.

The relay unit controller 206 communicates with the indoor controllers 203a, 203b, 203c, and 203d of the indoor units 2a, 2b, 2c, and 2d connected to the relay unit 3 by pipes, respectively, integrates pieces of operation information of the indoor units 2a, 2b, 2c, and 2d, and communicates the resulting information to the outdoor controller 202. Various control commands for each indoor unit 2 are supplied in form of serial signals from the outdoor controller 202 to the corresponding indoor controller 203 via the relay unit controller 206. Note that the relay unit controller 206 decides opening degrees of the expansion valves 54 and 55 in accordance with detected pressures detected by the pressure sensors 76 and 77.

Examples of the refrigerant used in the air-conditioning apparatus configured in the above-described manner include a single refrigerant, such as R-22 or R-134a; a near-azeotropic refrigerant mixture, such as R-410A or R-404A; a non-azeotropic refrigerant mixture, such as R-407C; a refrigerant, such as $CF_3CF=CH_2$, including a double bond in its chemical formula and assumed to have a relatively small global warming potential or a mixture of the above; and a natural refrigerant, such as $CO_2$ or propane.

Figure 3:
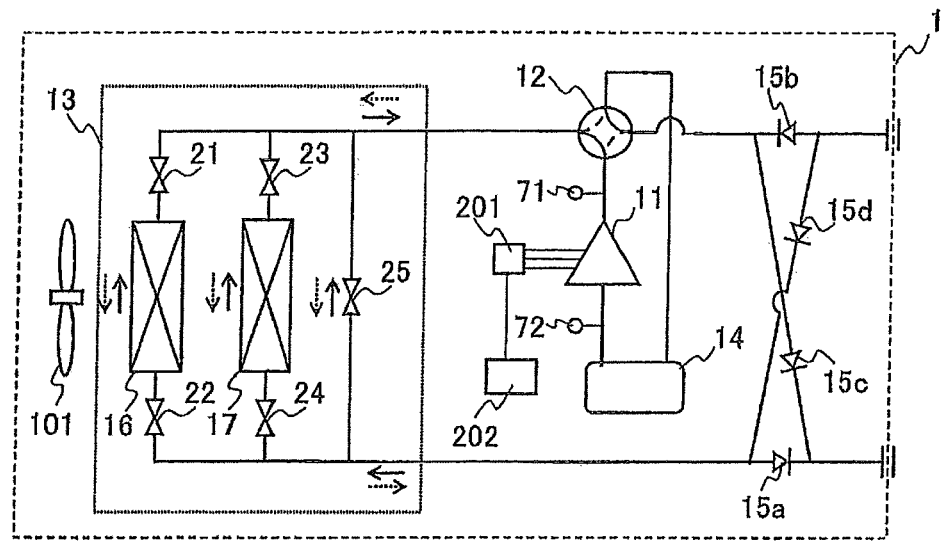
FIG. 3 is a partial circuit diagram illustrating an example of the configuration of an outdoor heat exchanger of the air-conditioning apparatus according to Embodiment 1 of the present invention.
Figure 4:
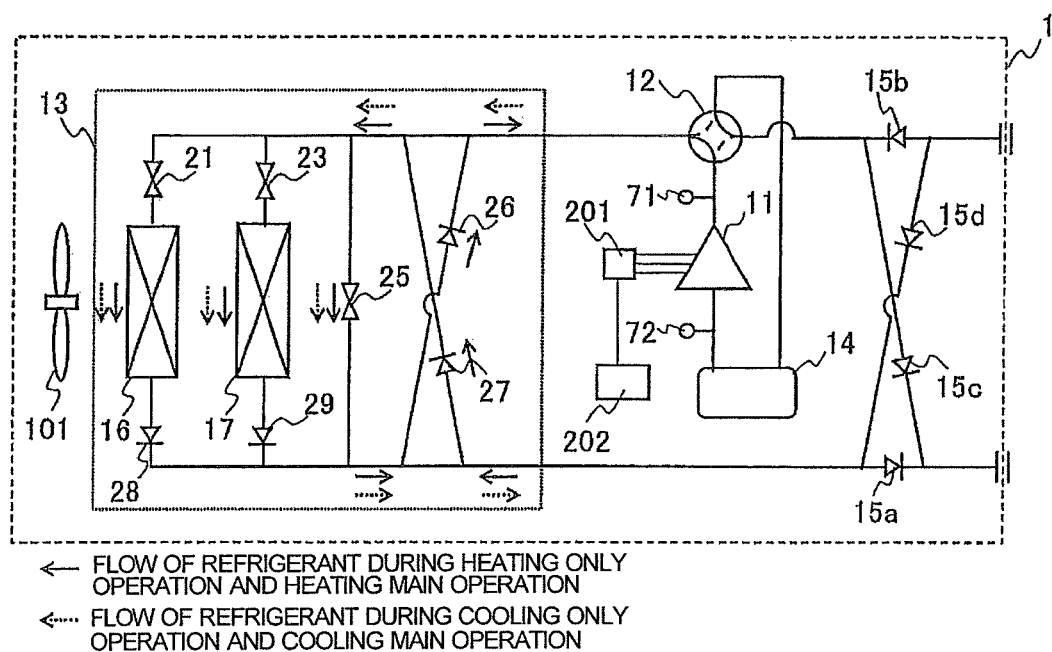
FIG. 4 is a partial circuit diagram illustrating another example of the configuration of the outdoor heat exchanger of the air-conditioning apparatus according to Embodiment 1 of the present invention.

FIG. 3 is a partial circuit diagram illustrating an example of the configuration of the outdoor heat exchanger 13. FIG. 4 is a partial circuit diagram illustrating another example of the configuration of the outdoor heat exchanger 13. Based on FIG. 3 and FIG. 4, the configuration of the outdoor heat exchanger 13 will be described. Note that, in FIG. 3 and FIG. 4, solid-line arrows represent a flow of the refrigerant during a heating only operation and a heating main operation and dotted-line arrows represent a flow of the refrigerant during a cooling only operation and a cooling main operation.

In the configuration illustrated in FIG. 3, the outdoor heat exchanger 13 includes outdoor heat exchange portions 16 and 17, heat exchanger opening and closing valves 21, 22, 23, and 24 serving as electromagnetic opening and closing devices (heat exchanger opening and closing devices), and a heat exchanger bypass valve 25 (heat exchanger bypass device). The heat exchanger opening and closing valves 21, 22, 23, and 24 and the heat exchanger bypass valve 25 each open or close in accordance with an instruction from the outdoor controller 202 and control the flow of the refrigerant into or from the outdoor heat exchanger 13, that is, the outdoor heat exchange portions 16 and 17. For example, either the heat exchanger opening and closing valve 21 (heat exchanger opening and closing valve 22) or the heat exchanger opening and closing valve 23 (heat exchanger opening and closing valve 24) is closed by the outdoor controller 202. This makes the refrigerant not flow into one of the outdoor heat exchange potions 16 and 17 and prevents heat exchange, and consequently the heat exchange capacity of the entire outdoor heat exchanger 13 can be decreased.

Also, the fan 101 is capable of changing its rotation speed in accordance with an instruction from the outdoor controller 202 to adjust an amount of air. With this change in the amount of air, the heat exchange capacity of the outdoor heat exchanger 13 can also be changed. For example, when the rotation speed of the fan 101 is decreased, the amount of air decreases, and thus the heat exchange capacity of the entire outdoor heat exchanger 13 can be decreased.

Further, by opening the heat exchanger bypass valve 25, the refrigerant can be made pass through the heat exchanger bypass valve 25 instead of passing through the outdoor heat exchanger 13. Thus, the heat exchange capacity of the entire outdoor heat exchanger 13 can be decreased.

Also, by making adjustment through closing the heat exchanger opening and closing valve 21 (heat exchanger opening and closing valve 22) or the heat exchanger opening and closing valve 23 (heat exchanger opening and closing valve 24), changing the amount of air of the fan 101, and allowing the refrigerant to bypass the outdoor heat exchange portion 16 or 17 using the heat exchanger bypass valve 25 appropriately in combination, the heat exchange capacity of the outdoor heat exchanger 13 can be changed in a continuous manner.

The case where the outdoor heat exchanger 13 includes two outdoor heat exchange portions 16 and 17 has been described; however, there may be three or more outdoor heat exchange portions. Also, sizes of the outdoor heat exchange portions 16 and 17 may be the same or different. Further, the heat exchange capacity of the outdoor heat exchanger 13 may be adjusted only with the fan 101.

In the configuration illustrated in FIG. 4, check valves 26 and 27 are installed in the outdoor heat exchanger 13. This allows the flow of the refrigerant flowing into the outdoor heat exchanger 13 to be unidirectional. Accordingly, the heat exchanger opening and closing valves 22 and 24 can be replaced by check valves 28 and 29, respectively, and control of the heat exchange capacity performed by the outdoor controller 202 can be simplified.

<Operation Modes>

Subsequently, an operation of the air-conditioning apparatus in each operation mode will be described based on the flow of the refrigerant. It is assumed here that high and low pressures in the refrigerant circuit or the like is not determined based on a relationship with a reference pressure but rather the high pressure and the low pressure are expressed as relative pressures caused by compression by the compressor 11, the refrigerant flow rate control by the expansion valves 32, and so on. Also, the same applies to high and low temperatures.

In the air-conditioning apparatus according to Embodiment 1, roughly four types of operation are performed. Specifically, the four types of operation are a heating only operation in which all the indoor units 2 perform a heating operation to heat indoor spaces, a cooling only operation in which all the indoor units 2 perform a cooling operation to cool indoor spaces, a heating main operation in which the indoor units 2 perform a cooling operation and a heating operation in a mixed manner and the capacity for the heating operation is larger, and a cooling main operation in which the capacity for a cooling operation is larger.

(Heating Only Operation)

Referring to FIG. 1, the heating only operation will be described. The flow of the refrigerant is represented by solid-line arrows in FIG. 1. In the outdoor unit 1, the refrigerant sucked by the compressor 11 is compressed and discharged as high-pressure gas refrigerant. The refrigerant that has exited from the compressor 11 flows through the four-way valve 12 and through the check valve 15c and the high-pressure pipe 6, and flows out of the outdoor unit 1. The refrigerant that has flowed into the relay unit 3 flows through the gas-liquid separator 51, the high-pressure gas pipe 61, the solenoid valves 56, and the gas branch pipes 41, and flows into the individual indoor units 2.

The gas refrigerant that has flowed into the individual indoor units 2 flows into the respective indoor heat exchangers 31 and heats air. Pressures of the liquid refrigerant that has flowed out of the respective indoor heat exchangers 31 are reduced to an intermediate pressure by the respective expansion valves 32, and the liquid refrigerant becomes intermediate-pressure liquid refrigerant. The intermediate-pressure liquid refrigerant flows out of the individual indoor units 2, flows through the respective liquid branch pipes 42 and the respective check valves 59, and then the individual streams of the refrigerant join together at the liquid pipe 64. From this point, the liquid refrigerant enters the bypass pipe 65 through the internal heat exchanger 53, and flows into the expansion valve 55 where the pressure of the liquid refrigerant is reduced so that the liquid refrigerant enters a low-temperature low-pressure two-phase gas-liquid state. The pressure-reduced refrigerant flows through the bypass pipe 65, the internal heat exchanger 53, and the internal heat exchanger 52, and then returns to the outdoor unit through the low-pressure pipe 7.

The refrigerant that has flowed into the outdoor unit flows through the check valve 15d into the outdoor heat exchanger 13 where the refrigerant exchanges heat with air to evaporate, and flows out as gas refrigerant or two-phase gas-liquid refrigerant. The refrigerant that has evaporated is sucked by the compressor 11 again through the four-way valve 12 and the accumulator 14.

At this time, pressure at the high-pressure pipe 6 is high, pressure at the outdoor heat exchanger 13 is low, pressure at a portion between the compressor 11 and the check valve 15b is high, and pressure at the low-pressure pipe 7 is low. Accordingly, the refrigerant does not flow through the check valves 15a and 15b. Also, the solenoid valves 57 are closed.

(Cooling Only Operation)

Referring to FIG. 1, the cooling only operation will be described. The flow of the refrigerant is represented by dotted-line arrows in FIG. 1. In the outdoor unit, the refrigerant sucked by the compressor 11 is compressed and discharged as high-pressure gas refrigerant. The refrigerant that has exited from the compressor 11 flows through the four-way valve 12 into the outdoor heat exchanger 13 that functions as a condenser, where the refrigerant condenses, and flows out as high-pressure liquid refrigerant. The refrigerant then flows through the check valve 15a and the high-pressure pipe 6, and flows out of the outdoor unit. The refrigerant that has flowed into the relay unit 3 flows sequentially through the gas-liquid separator 51, the liquid pipe 62, the internal heat exchanger 52, the expansion valve 54, and the internal heat exchanger 53, and branches at the liquid pipe 63. The resulting refrigerant flows through the check valves 58 and the liquid branch pipes 42, and flows into the individual indoor units 2.

The refrigerant that has flowed into the individual indoor units 2 expands in response to adjustment of the opening degrees of the respective expansion valves 32, and the resulting low-temperature low-pressure two-phase gas-liquid refrigerant flows through the respective indoor heat exchangers 31 and cools air. The gas refrigerant flows out of the individual indoor unit 2, flows through the gas branch pipes 41 and the solenoid valves 57, and the individual steams of the refrigerant join together. The refrigerant then flows through the low-pressure pipe 7, and returns to the outdoor unit. The refrigerant that has flowed into the outdoor unit is sucked by the compressor 11 again through the check valve 15b, the four-way valve 12, and the accumulator 14.

At this time, pressure at the high-pressure pipe 6 is high, pressure at a portion between the compressor 11 and the check valve 15c is low, pressure at a portion between the outdoor heat exchanger 13 and the check valve 15d is high, and pressure at the low-pressure pipe 7 is low. Accordingly, the refrigerant does not flow through the check valves 15c and 15d. Also, the solenoid valves 56 are closed.

Also, during this cycle, part of the refrigerant that has passed through the expansion valve 54 flows into the bypass pipe 65, and the pressure thereof is reduced by the expansion valve 55, and heat thereof is exchanged with the refrigerant flowing toward the liquid pipe 63 from the expansion valve 54 at the internal heat exchanger 53. The refrigerant that has passed through the internal heat exchanger 53 exchanges heat with the refrigerant that flows into the expansion valve 54 at the internal heat exchanger 52. The refrigerant that has evaporated as a result of heat exchange performed at the internal heat exchanger 52 joins, at the low-pressure pipe 7, the refrigerant that has cooled air in the indoor units 2, and returns to the outdoor unit. On the other hand, the refrigerant that has been cooled through heat exchange performed at the internal heat exchanger 52 and the internal heat exchanger 53 and has a sufficient degree of subcooling flows into the indoor units 2 through the check valves 58 and the liquid branch pipes 42.

(Heating Main Operation)

Figure 5:
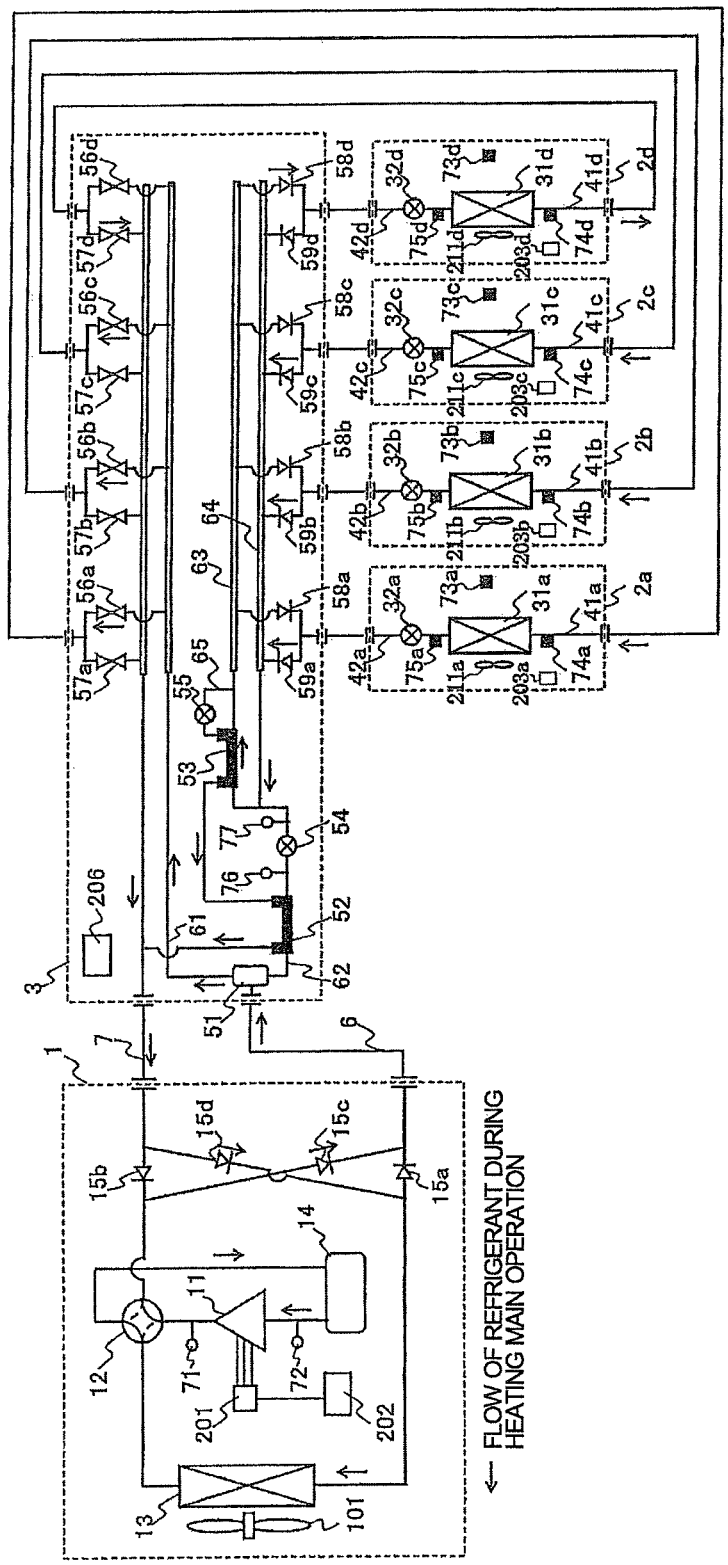
FIG. 5 is a refrigerant circuit diagram illustrating a heating main operation of the air-conditioning apparatus according to Embodiment 1 of the present invention.

FIG. 5 is a refrigerant circuit diagram illustrating a heating main operation of the air-conditioning apparatus according to Embodiment 1 of the present invention. Referring to FIG. 5, the heating main operation will be described. It is assumed here that the indoor units 2a, 2b, and 2c perform a heating operation and the indoor unit 2d performs a cooling operation by way of example.

In the outdoor unit, the refrigerant sucked by the compressor 11 is compressed and discharged as high-pressure gas refrigerant. The refrigerant that has exited from the compressor 11 flows through the four-way valve 12 and through the check valve 15c and the high-pressure pipe 6, and flows out of the outdoor unit. The refrigerant that has flowed into the relay unit 3 flows through the gas-liquid separator 51 and the high-pressure gas pipe 61, and flows through the solenoid valves 56a, 56b, 56c and the gas branch pipes 41a, 41b, and 41c into the indoor units 2a, 2b, and 2c that perform a heating operation, respectively.

The gas refrigerant that has flowed into the indoor units 2a, 2b, and 2c flows into the indoor heat exchangers 31a, 31b, and 31c, respectively, and heats air. Pressures of the liquid refrigerant that has flowed out of the indoor heat exchangers 31a, 31b, and 31c are reduced to an intermediate pressure by the expansion valves 32a, 32b, and 32c, respectively, and the liquid refrigerant becomes intermediate-pressure liquid refrigerant. The intermediate-pressure liquid refrigerant flows out of the indoor units 2a, 2b, and 2c, passes through the liquid branch pipes 42a, 42b, and 42c and the check valves 59a, 59b, and 59c, respectively, and the individual streams of the refrigerant join together at the liquid pipe 64.

The resulting intermediate-pressure liquid refrigerant passes through the internal heat exchanger 53, and part thereof flows into the indoor unit 2d through the liquid pipe 63, the check valve 58d, and the liquid branch pipe 42d. The refrigerant that has flowed into the indoor unit 2d expands in response to adjustment of the opening degree of the expansion valve 32d, and the resulting low-temperature low-pressure two-phase gas-liquid refrigerant flows into the indoor heat exchanger 31d and cools air. The gas refrigerant flows out of the indoor unit 2d, passes through the gas branch pipe 41d and the solenoid valve 57d, and reaches the low-pressure pipe 7. On the other hand, the rest of the intermediate-pressure liquid refrigerant that has passed through the internal heat exchanger 53 flows into the bypass pipe 65, passes through the expansion valve 55 which is controlled to make a different between the high pressure at the high-pressure pipe 6 and the intermediate pressure that is a pressure at the liquid pipes 63 and 64 constant, passes through the internal heat exchanger 53 and the internal heat exchanger 52, and reaches the low-pressure pipe 7 where the refrigerant joins the refrigerant that has cooled air in the indoor unit 2d. The resulting refrigerant returns to the outdoor unit as low-temperature low-pressure two-phase gas-liquid refrigerant.

The refrigerant that has flowed into the outdoor unit flows through the check valve 15*d* into the outdoor heat exchanger 13 where the refrigerant exchanges heat with air to evaporate, and flows out as gas refrigerant or two-phase gas-liquid refrigerant. The refrigerant that has evaporated is sucked by the compressor 11 again through the four-way valve 12 and the accumulator 14.

At this time, pressure at the high-pressure pipe 6 is high, pressure at the outdoor heat exchanger 13 is low, pressure at a portion between the compressor 11 and the check valve 15*b* is high, and pressure at the low-pressure pipe 7 is low. Accordingly, the refrigerant does not flow through the check valves 15*a* and 15*b*. Also, the solenoid valves 56*d*, 57*a*, 57*b*, and 57*c* are closed. In addition, during this cycle, the refrigerant that has entered the bypass pipe 65 exchanges heat with the refrigerant flowing from the liquid pipe 64 at the internal heat exchanger 53 after the pressure thereof has been reduced by the expansion valve 55. Thus, the refrigerant that flows into the indoor unit 2*d* through the check valve 58*d* and the liquid branch pipe 42*d* is cooled and has a sufficient degree of subcooling.

(Cooling Main Operation)

Figure 6:
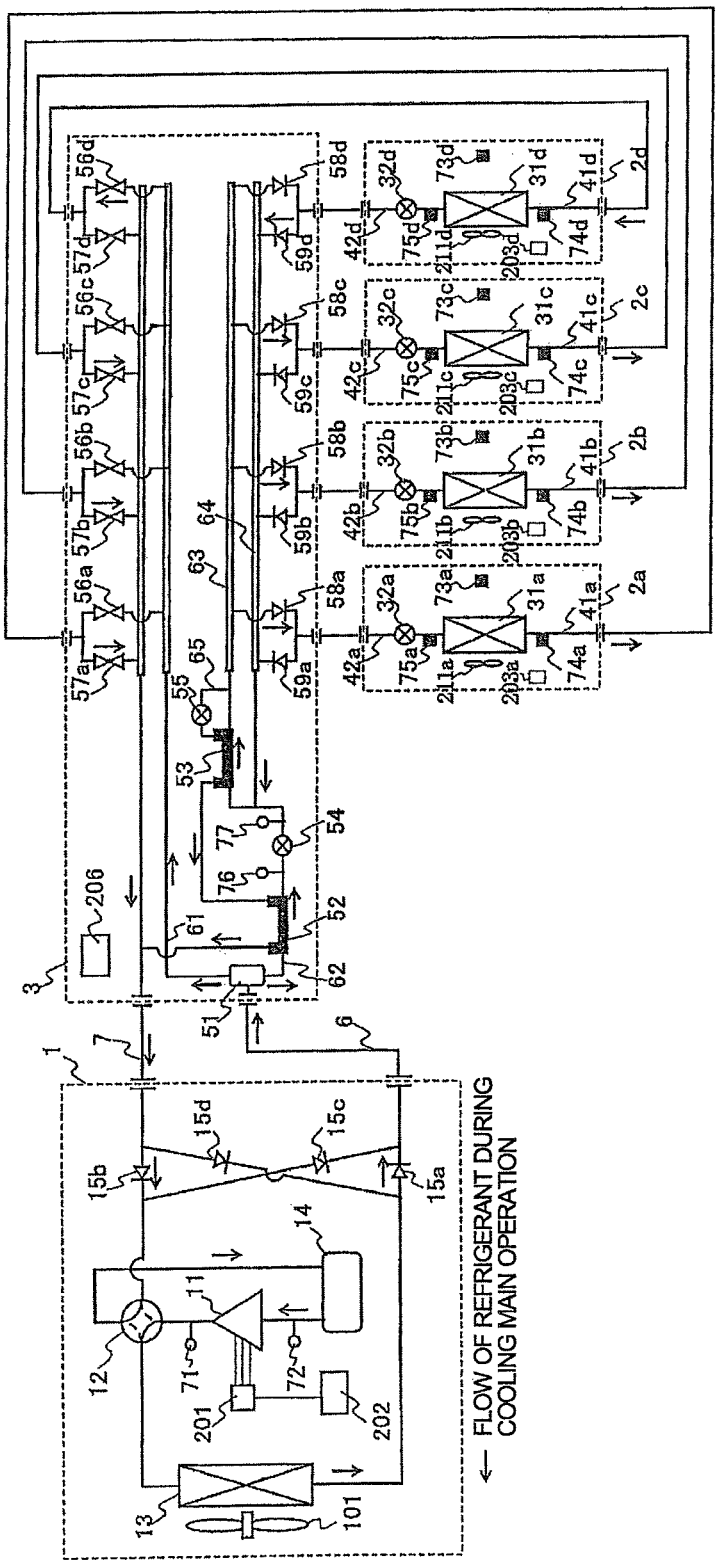
FIG. 6 is a refrigerant circuit diagram illustrating a cooling main operation of the air-conditioning apparatus according to Embodiment 1 of the present invention.

FIG. 6 is a refrigerant circuit diagram illustrating a cooling main operation of the air-conditioning apparatus according to Embodiment 1 of the present invention. Referring to FIG. 6, the cooling main operation will be described. It is assumed here that the indoor units 2*a*, 2*b*, and 2*c* perform a cooling operation and the indoor unit 2*d* performs a heating operation by way of example.

In the outdoor unit, the refrigerant sucked by the compressor 11 is compressed and discharged as high-pressure gas refrigerant. The refrigerant that has exited from the compressor 11 flows through the four-way valve 12 and the outdoor heat exchanger 13 functioning as a condenser, where the refrigerant of a given amount condenses, and flows out as high-pressure two-phase gas-liquid refrigerant. The refrigerant then flows through the check valve 15*a* and the high-pressure pipe 6, and flows out of the outdoor unit. The refrigerant that has flowed into the relay unit 3 flows through the gas-liquid separator 51 where the refrigerant is separated into gas refrigerant and liquid refrigerant. The separated gas refrigerant passes through the high-pressure gas pipe 61, and flows through the solenoid valve 56*d* and the gas branch pipe 41*d* into the indoor unit 2*d* that performs a heating operation.

The gas refrigerant that has flowed into the indoor unit 2*d* flows into the indoor heat exchanger 31*d* and heats air. Pressure of the resulting liquid refrigerant that has flowed out of the indoor heat exchanger 31*d* is reduced to an intermediate pressure by the expansion valve 32*d*, and the liquid refrigerant becomes intermediate-pressure liquid refrigerant. The intermediate-pressure liquid refrigerant flows out of the indoor unit 2*d*, passes through the liquid branch pipe 42*d* and the check valve 59*d*, and then reaches the liquid pipe 64.

On the other hand, the liquid refrigerant separated at the gas-liquid separator 51 flows out of the liquid pipe 62, passes through the expansion valve 54 which is controlled to make a difference between the high pressure at the high-pressure pipe 6 and the intermediate pressure that is a pressure at the liquid pipes 63 and 64 constant, and joins the liquid refrigerant that has heated air in the indoor unit 2*d* and is flowing through the liquid pipe 64. The resulting liquid refrigerant passes through the internal heat exchanger 53, and part thereof flows into the liquid pipe 63 and flows into the indoor units 2*a*, 2*b*, and 2*c* through the check valves 58*a*, 58*b*, and 58*c* and the liquid branch pipes 42*a*, 42*b*, and 42*c*, respectively.

The refrigerant that has flowed into the indoor units 2*a*, 2*b*, and 2*c* expands in response to adjustment of opening degrees of the expansion valves 32*a*, 32*b*, and 32*c*, and the resulting low-temperature low-pressure two-phase gas-liquid refrigerant flows into the indoor heat exchangers 31*a*, 31*b*, and 31*c* and cools air, respectively. The gas refrigerant flows out of the indoor units 2*a*, 2*b*, and 2*c*, passes through the gas branch pipes 41*a*, 41*b*, and 41*c* and the solenoid valves 57*a*, 57*b*, and 57*c*, respectively, and the individual streams of the refrigerant join together. The resulting refrigerant passes through the low-pressure pipe 7 and returns to the outdoor unit. The refrigerant that has flowed into the outdoor unit is sucked by the compressor 11 again through the check valve 15*b*, the four-way valve 12, and the accumulator 14.

At this time, pressure at the high-pressure pipe 6 is high, pressure at a portion between the compressor 11 and the check valve 15*c* is low, pressure at a portion between the outdoor heat exchanger 13 and the check valve 15*d* is high, and pressure at the low-pressure pipe 7 is low. Accordingly, the refrigerant does not flow through the check valves 15*c* and 15*d*. Also, the solenoid valves 56*a*, 56*b*, 56*c*, and 57*d* are closed.

Also, during this cycle, part of the refrigerant at the liquid pipe 63 flows into the bypass pipe 65, and pressure thereof is reduced by the expansion valve 55, and heat thereof is exchanged with the refrigerant flowing toward the liquid pipe 63 from the expansion valve 54 at the internal heat exchanger 53. Further, the refrigerant that has passed through the internal heat exchanger 53 exchanges heat with the refrigerant that flows into the expansion valve 54 at the internal heat exchanger 52. The refrigerant that has evaporated as a result of heat exchange performed at the internal heat exchanger 52 joins at the low-pressure pipe 7 the refrigerant that has cooled air in the indoor units 2*a*, 2*b*, and 2*c*, and returns to the outdoor unit. On the other hand, the refrigerant that has been cooled through heat exchange performed at the internal heat exchanger 52 and the internal heat exchanger 53 and has a sufficient degree of subcooling flows into the indoor units 2*a*, 2*b*, and 2*c* through the check valves 58*a*, 58*b*, and 58*c* and the liquid branch pipes 42*a*, 42*b*, and 42*c*, respectively.

<Actuator Control in Air-Conditioning Apparatus According to Embodiment 1>

Subsequently, a method for controlling various actuators provided in the air-conditioning apparatus according to Embodiment 1 that is operated in the above-described manner will be described.

(Control of Capacity of Compressor 11)

Control of a capacity of the compressor 11 will be described. The rotation speed of the compressor 11 is controlled in accordance with a command from the outdoor controller 202. Specifically, during a heating only operation and a heating main operation, the rotation speed of the compressor 11 is controlled using, as a target value, a discharge pressure detected by the pressure sensor 71. In this way, the flow rate of the refrigerant in the entire refrigeration cycle of the air-conditioning apparatus according to Embodiment 1 is adjusted. In other words, during a heating only operation and a heating main operation, the outdoor controller 202 controls the rotation speed of the compressor 11 such that a condensing saturation temperature (hereinafter, also simply referred to as a condensing temperature) of the refrigerant becomes a predetermined condensing saturation temperature target value. At this time, it is desirable that the discharge pressure be equivalent to approximately 50 degrees C. when being converted into the saturation temperature of the refrigerant.

Also, during a cooling only operation and a cooling main operation, the rotation speed of the compressor 11 is controlled using, as the target value, a suction pressure detected by the pressure sensor 72. In this way, the flow rate of the refrigerant in the entire refrigeration cycle of the air-conditioning apparatus according to Embodiment 1 is adjusted. In other words, during a cooling only operation and a cooling main operation, the outdoor controller 202 controls the rotation speed of the compressor 11 such that an evaporating saturation temperature (hereinafter, also simply referred to as an evaporating temperature) of the refrigerant becomes a predetermined evaporating saturation temperature target value. At this time, it is desirable that the suction pressure be equivalent to approximately 0 degrees C. when being converted into the saturation temperature.

(Control of Heat Exchange Capacity of Outdoor Heat Exchanger 13)

Control of the heat exchange capacity of the outdoor heat exchanger 13 will be described. As described before, the heat exchange capacity of the outdoor heat exchanger 13 is controlled in accordance with a command from the outdoor controller 202. During a heating main operation, evaporation of the refrigerant, which is performed in the outdoor heat exchanger 13 during a heating only operation, is partially performed in the indoor unit 2 that performs a cooling operation. In this way, a simultaneous cooling and heating operation is implemented. At this time, a balance between a cooling load of the indoor unit 2 that performs cooling and an amount of heat removed in the outdoor heat exchanger 13 can be adjusted by controlling the heat exchange capacity using the suction pressure detected by the pressure sensor 72 as the target value. For example, it is desirable that the suction pressure be equivalent to approximately 0 degrees C. when being converted into the saturation temperature.

On the other hand, during a cooling main operation, condensation of the refrigerant, which is performed in the outdoor heat exchanger 13 during a cooling only operation, is partially performed in the indoor unit 2 that performs a heating operation. In this way, a simultaneous cooling and heating operation is implemented. At this time, a balance between a heating load of the indoor unit 2 that performs heating and an amount of heat transferred in the outdoor heat exchanger 13 can be adjusted by controlling the heat exchange capacity using the discharge pressure detected by the pressure sensor 71 as the target value. For example, it is desirable that the discharge pressure be equivalent to approximately 50 C when being converted into the saturation temperature.

(Action of Refrigeration Cycle for Control of Capacity of Compressor 11)

An action of the refrigeration cycle for control of the capacity of the compressor 11 will be described. If the heating load (sucked air temperature of the indoor unit 2) is constant during a heating only operation and a heating main operation, the flow rate of the refrigerant that condenses in the indoor unit 2 that performs a heating operation increases when the rotation speed of the compressor 11 is increased. Accordingly, the condensing temperature increases in order to increase a difference in temperature between the refrigerant and air. In other words, in the case where the rotation speed of the compressor 11 is controlled using the condensing temperature as the target value, the rotation speed of the compressor 11 increases when the condensing temperature target value is increased.

If the cooling load (sucked air temperature of the indoor unit 2) is constant during a cooling only operation and a cooling main operation, the flow rate of the refrigerant that evaporates in the indoor unit 2 that performs a cooling operation increases when the rotation speed of the compressor 11 is increased. Accordingly, the evaporating temperature decreases in order to increase a difference in temperature between air and the refrigerant. In other words, in the case where the rotation speed of the compressor 11 is controlled using the evaporating temperature as the target value, the rotation speed of the compressor 11 increases when the evaporating temperature target value is decreased.

(Action of Refrigeration Cycle for Control of Heat Exchange Capacity of Outdoor Heat Exchanger 13)

An action of the refrigeration cycle for control of the heat exchange capacity of the outdoor heat exchanger 13 will be described. If the cooling load (indoor suction temperature) of the indoor unit 2 is constant during a heating main operation, when the heat exchange capacity of the outdoor heat exchanger 13 is decreased, the heat exchange capacity of an evaporator composed of the outdoor heat exchanger 13 and the indoor heat exchanger 31 of the indoor unit 2 that performs a cooling operation within the entire refrigeration cycle decreases. At this time, if the amount of heat exchanged by the refrigerant that evaporates in the evaporator does not change, the evaporating temperature decreases in order to increase a difference in temperature between air and the refrigerant.

In other words, in the case where the heat exchange capacity of the outdoor heat exchanger 13 is controlled using the evaporating temperature as the target value, the heat exchange capacity decreases when the evaporating temperature target value is decreased. Because the heat exchange capacity (heat transfer area) of the indoor heat exchanger 31 of the indoor unit 2 that performs a cooling operation is not changed, cooling performance of the indoor unit 2 increases when the evaporating temperature decreases. On the other hand, in the outdoor heat exchanger 13 whose heat exchange capacity has decreased, an amount of exchanged heat decreases.

If the heating load (indoor suction temperature) of the indoor unit 2 is constant during a cooling main operation, when the heat exchange capacity of the outdoor heat exchanger 13 is decreased, the heat exchange capacity of a condenser composed of the outdoor heat exchanger 13 and the indoor heat exchanger 31 of the indoor unit 2 that performs a heating operation within the entire refrigeration cycle decreases. At this time, if the amount of heat exchanged by the refrigerant that condenses in the condenser does not change, the condensing temperature rises in order to increase a difference in temperature between air and the refrigerant.

In other words, in the case where the heat exchange capacity of the outdoor heat exchanger 13 is controlled using the condensing temperature as the target value, the heat exchange capacity decreases when the condensing temperature target value is increased. Because the heat exchange capacity (heat transfer area) of the indoor heat exchanger 31 of the indoor unit 2 that performs a heating operation is not changed, heating performance of the indoor unit 2 increases when the condensing temperature rises. On the other hand, in the outdoor heat exchanger 13 whose heat exchange capacity has decreased, an amount of exchanged heat decreases.

(Control of Flow Rate of Expansion Valve 32)

Control of the flow rate of the refrigerant in the indoor unit 2 will be described. The opening degree of the expansion valve 32 is controlled in accordance with a command from the indoor controller 203. Specifically, during a heating operation, the opening degree of the expansion valve 32 is controlled using the degree of subcooling of the indoor heat exchanger 31 as the target value to adjust the flow rate of the refrigerant that flows into the corresponding indoor unit 2. A method for calculating the degree of subcooling is as described below. A discharge pressure detected by the pressure sensor 71 of the outdoor unit is converted by the outdoor controller 202 into a condensing temperature which is a saturation temperature, and the condensing temperature is transmitted to each indoor controller 203 of the corresponding indoor unit. The indoor controller 203 calculates the degree of subcooling from a difference between the condensing temperature and the liquid-side temperature of the refrigerant detected by the temperature sensor 75. At this time, it is desirable that the degree of subcooling be approximately 8 degrees C.

During a cooling operation, the opening degree of the expansion valve 32 is controlled using the degree of superheat of the indoor heat exchanger 31 as the target value to adjust the flow rate of the refrigerant that flows into the corresponding indoor unit 2. The degree of subcooling is calculated by the indoor controller 203 from a difference between the gas-side temperature of the refrigerant detected by the temperature sensor 74 and the liquid-side temperature of the refrigerant detected by the temperature sensor 75. At this time, it is desirable that the degree of superheat be approximately 3 degrees C.

<Relationship between Indoor Load and Refrigerant Actuator Control>

First, control of the condensing temperature (discharge pressure) and the evaporating temperature (suction pressure) will be described. During a heating operation, the condensing temperature of the refrigerant is controlled within a certain range. In this way, a certain heating performance can be achieved even in the case where the indoor units 2 have different heating loads as in a multi-room air-conditioning apparatus. During a cooling operation, the evaporating temperature of the refrigerant is controlled within a certain range. In this way, a certain cooling performance can be achieved even in the case where the indoor units 2 have different cooling loads as in a multi-room air-conditioning apparatus.

Next, control of the degree of subcooling and the degree of superheat will be described. For example, suppose that the indoor unit 2 is performing a heating operation at a certain condensing temperature and a certain degree of subcooling. At this time, in response to a fall in the sucked air temperature of the indoor unit 2, that is, an increase in the load, the amount of heat exchanged in the indoor heat exchanger 31 increases and a larger amount of refrigerant condenses if the opening degree of the expansion valve 32 is kept unchanged and the flow rate of the refrigerant in the indoor heat exchanger 31 is kept constant. Thus, the degree of subcooling increases. At this time, if the opening degree of the expansion valve 32 is increased, the flow rate of the refrigerant that condenses in the indoor heat exchanger 31 increases, and thus the degree of subcooling decreases and becomes closer to the target value. Also, the amount of heat exchanged in the indoor heat exchanger 31 increases, and thus the heating performance of the indoor unit 2 can be increased.

On the other hand, in response to a rise in the sucked air temperature of the indoor unit 2, that is, a decrease in the load, the amount of heat exchanged in the indoor heat exchanger 31 decreases and a smaller amount of the refrigerant condenses. Thus, the degree of subcooling decreases. At this time, if the opening degree of the expansion valve 32 is decreased, the flow rate of the refrigerant that condenses in the indoor heat exchanger 31 decreases, and thus the degree of subcooling increases and becomes closer to the target value. Also, the amount of heat exchanged in the indoor heat exchanger 31 decreases, and thus the heating performance of the indoor unit 2 can be decreased. That is, in the case where the opening degree of the expansion valve 32 is controlled using the degree of subcooling as the target value, the opening degree of the expansion valve 32 decreases when the degree-of-subcooling target value is increased.

As described above, a certain heating performance can be achieved for an indoor load by controlling the condensing temperature and the degree of subcooling.

During a cooling operation, when the sucked air temperature of the indoor unit 2 is high, that is, the load increases, the degree of superheat increases. When the sucked air temperature of the indoor unit 2 is low, that is, the load decreases, the degree of superheat decreases. Accordingly, a certain cooling performance can be achieved for an indoor load by controlling the evaporating temperature and the degree of superheat. That is, in the case where the opening degree of the expansion valve 32 is controlled using the degree of superheat as the target value, the opening degree of the expansion valve 32 decreases when the degree-of-superheat target value is increased.

<Control Method for Increasing Heating Performance of at Least One of Indoor Units>

A description will be given of control, performed by the air-conditioning apparatus according to Embodiment 1 in response to a request to increase heating performance from at least one of the indoor units 2 during a cooling main operation, for making the heating performance of the indoor unit 2 which has made the request higher than that of a designed capacity by making the heat exchange capacity of the outdoor heat exchanger 13 smaller than usual and for suppressing the heating performance from becoming excessive by suppressing the flow rate of the refrigerant in the other indoor units 2. Here, the case where a request to increase heating performance is made by the indoor unit 2b will be described.

Figure 7:
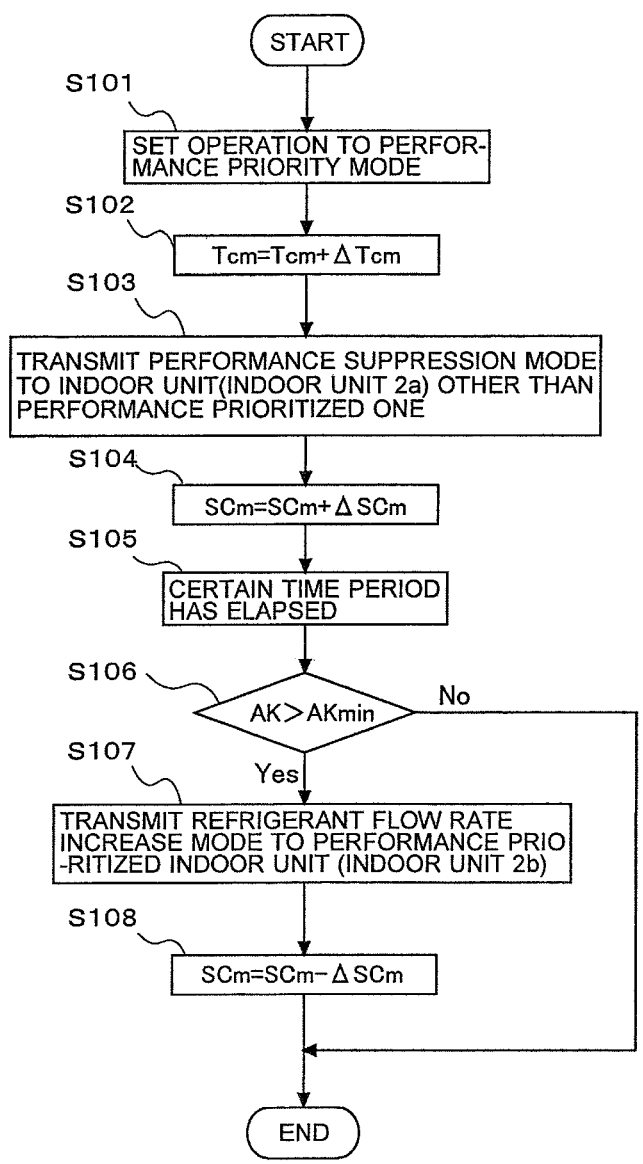
FIG. 7 is a flowchart illustrating control for increasing heating performance performed by the air-conditioning apparatus according to Embodiment 1 of the present invention.

FIG. 7 is a flowchart illustrating control for increasing heating performance performed by the air-conditioning apparatus according to Embodiment 1 of the present invention. Based on FIG. 7, the case of increasing the heating performance of the indoor unit 2b by changing values of a condensing temperature target value Tcm and a degree-of-subcooling target value SCm will be described by way of example. It is assumed that the indoor units 2a and 2b perform a heating operation and the indoor units 2c and 2d perform a cooling operation in this case. Here, the indoor heat exchanger 31b corresponds to a "first use side heat exchanger" of the present invention. Also, the indoor heat exchanger 31a corresponds to a "second use side heat exchanger" of the present invention.

Upon receipt of a request to increase heating performance from the operation unit 204b of the indoor unit 2b, the indoor controller 203b transmits heating performance priority to the outdoor controller 202. Upon receipt of the heating performance priority, the outdoor controller 202 starts the flow of FIG. 7 and sets the operation mode of the air-conditioning apparatus to a performance priority mode (step S101). In step S102, the outdoor controller 202 increases the condensing temperature target value Tcm by ΔTcm. At this time, a heat exchange capacity AK of the outdoor heat exchanger 13 is controlled based on a condensing temperature Tc. Accordingly, if the heat exchange capacity AK is larger than the minimum heat exchange capacity AKmin, the heat exchange capacity AK decreases when the condensing temperature target value Tcm increases.

In step S103, the outdoor controller 202 transmits a performance suppression mode to the indoor unit 2 (here, the indoor unit 2a) other than the performance prioritized one. The indoor controller 203a of the indoor unit 2a that has received the performance suppression mode increases the degree-of-subcooling target value SCm of the indoor heat exchanger 31a by ΔSCm in step S104. At this time, an opening degree L of the expansion valve 32a is controlled based on a calculated degree-of-subcooling value SC. Accordingly, the opening degree L decreases when the degree-of-subcooling target value SCm increases.

Because the operation state of the refrigeration cycle changes in response to changes in the heat exchange capacity AK of the outdoor heat exchanger 13 and the opening degree of the expansion valve, the outdoor controller 202 allows a certain period to pass in step S105. It is desirable that this certain period be approximately 3 minutes to 5 minutes. In step S106, the outdoor controller 202 determines whether the heat exchange capacity AK of the outdoor heat exchanger 13 is larger than the minimum heat exchange capacity AKmin. If the heat exchange capacity AK is larger than the minimum heat exchange capacity AKmin (Yes), the outdoor controller 202 transmits a refrigerant flow rate increase mode to the performance prioritized indoor unit 2b in step S107. Note that if the heat exchange capacity AK is the minimum heat exchange capacity AKmin (No) in step S106, the flow ends.

The indoor controller 203b that has received the refrigerant flow rate increase mode decreases the degree-of-subcooling target value SCm of the indoor heat exchanger 31b by ΔSCm in step S108. At this time, the opening degree L of the expansion valve 32b is controlled based on the calculated degree-of-subcooling value SC. Accordingly, the opening degree L increases when the degree-of-subcooling target value SCm decreases. At this point, the flow for changing the values of the condensing temperature target value Torn and the degree-of-subcooling target value SCm ends; however, the resulting Tcm and SCm are maintained until the heating performance priority request is canceled by the operation unit 204b of the indoor unit 2b.

<Effects of Control for Increasing Heating Performance>

As described above, in the air-conditioning apparatus configured as in Embodiment 1, because the condensing temperature target value Tcm is increased in step S102, the heat exchange capacity AK of the outdoor heat exchanger 13 becomes smaller than the heat exchange capacity AK that allows a certain heating performance of the refrigeration cycle to be achieved. That is, because the amount of heat transferred in the indoor heat exchanger 31b increases, the heating performance can be made larger than the certain performance.

Also, because the degree-of-subcooling target value SCm is increased in step S104 in the indoor heat exchanger 31a other than the performance prioritized one, the opening degree L of the expansion valve 32a decreases. That is, because the flow rate of the refrigerant that flows through the indoor heat exchanger 31a decreases, an increase in the heating performance due to a decrease in the heat exchange capacity AK of the outdoor heat exchanger 13 can be suppressed in the indoor unit 2a other than the performance prioritized one.

If the operation capacity of the compressor 11 is increased during a cooling main operation, the flow rate of the refrigerant in the entire refrigeration cycle increases, and thus the condensing temperature target value Tcm can be increased; however, in such a case, cooling performance of 2c and 2d that perform a cooing operation also increases at the same time. For this reason, it is more effective to decrease the heat exchange capacity AK of the outdoor heat exchanger 13 in order to increase the condensing temperature target value Tcm.

Also, in the case where only the heat exchange capacity AK of the outdoor heat exchanger 13 is decreased by increasing the condensing temperature target value Tcm without changing the degree-of-subcooling target value SCm of the indoor heat exchanger 31a, heating performance of all the indoor heat exchangers 31 that perform a heating operation increases and effects of increasing the performance of the performance prioritized indoor unit 2b decrease. However, the effects of increasing the performance of the performance prioritized indoor unit 2b can be further increased by increasing the degree-of-subcooling target value SCm in the indoor heat exchanger 31a other than the performance prioritized one.

Also, in the performance prioritized indoor heat exchanger 31b, because the degree-of-subcooling target value SCm is decreased in step S108, the opening degree L of the expansion valve 32b increases. That is, the flow rate of the refrigerant that flows through the indoor heat exchanger 31b increases, and thus the heating performance of the indoor unit 2b can be increased. In the case where the heating performance of the performance prioritized indoor heat exchanger 31b is increased by only increasing the opening degree L of the expansion valve 32b without increasing the condensing temperature target value Tcm at this time, the opening degree L of the expansion valve 32b needs to be further increased. Then, the degree of subcooling of the indoor heat exchanger 31b becomes extremely small, and thus it becomes difficult to control the opening degree L of the expansion valve 32b using the degree of subcooling as the target value.

Further, when the degree of subcooling is small and a two-phase gas-liquid state occurs at the refrigerant outlet of the indoor heat exchanger 31b, for example, the density of the refrigerant that flows into the expansion valve 32b varies and the refrigerant flow-rate control possibly becomes unstable. Accordingly, the heating performance of the performance prioritized indoor heat exchanger 31b can be increased more effectively by increasing the condensing temperature target value Tcm.

Also, in the case where the heat exchange capacity AK of the outdoor heat exchanger 13 is the minimum heat exchange capacity AKmin in step S102, the heat exchange capacity AK cannot be decreased; however, even in this case, the heating performance of the performance prioritized indoor unit 2b can be increased by decreasing the flow rate of the refrigerant that flows through the indoor heat exchanger 31a other than the performance prioritized one in step S104 and by increasing the flow rate of the refrigerant that flows through the performance prioritized indoor heat exchanger 31b in step S108.

Also, in the case where the heat exchange capacity AK of the outdoor heat exchanger 13 is the minimum heat exchange capacity AKmin in step S106, the degree-of-subcooling target value SCm of the performance prioritized indoor heat exchanger 31b is not changed. This is performed in order to prevent the condensing temperature Tc from falling as a result of failing to maintain the condensing temperature Tc at the condensing temperature target value Tcm when the opening degree L of the expansion valve 32b is increased to increase the flow rate of the refrigerant in the indoor heat exchanger 31b in the state where the heat exchange capacity AK is the minimum heat exchange capacity AKmin.

Also, in Embodiment 1, the heating performance of the indoor unit 2 that performs heating can be increased while the air-conditioning apparatus is performing the cooling main operation. For example, when the operation mode of the outdoor unit is changed from a cooling main operation to a heating main operation, the four-way valve 12 needs to be switched so as to switch the outdoor heat exchanger 13 from a condenser into an evaporator. In such a case, it takes some time for the air-conditioning apparatus to become stable and enters a steady state. However, even in the case where higher heating performance is temporarily needed, the operation mode of the outdoor unit need not be changed from the cooling main operation to the heating main operation, and the refrigeration cycle can be operated stably.

In Embodiment 1, control for increasing heating performance of the indoor unit 2 during a cooling main operation has been described; however, control for increasing cooling performance may be performed during a heating main operation. In this case, an evaporating temperature target value Tem may be decreased by ΔTem so as to make the heat exchange capacity AK of the outdoor heat exchanger 13 smaller than the heat exchange capacity AK that allows the refrigeration cycle to achieve a certain cooling performance. Also, a degree-of-superheat target value SHm of the indoor heat exchanger 31 of the performance prioritized indoor unit 2 may be decreased by ΔSHm so as to increase the flow rate of the refrigerant and the degree-of-superheat target value SHm of the indoor heat exchanger 31 other than the performance prioritized one may be increased by ΔSHm so as to decrease the flow rate of the refrigerant.

Embodiment 2

In Embodiment 1 above, the air-conditioning apparatus that circulates the refrigerant directly through the indoor units 2 to perform cooling and heating has been described. Next, an embodiment of an air-conditioning apparatus connected to a unit that allows heat exchange between a refrigerant and a heat medium such as water in an intermediate heat exchanger and circulates the heat medium through the indoor units 2 will be described. That is, in Embodiment 2, an embodiment of an air-conditioning apparatus including indirect indoor units (indirect indoor heat exchangers) that perform air-conditioning in rooms using a heat medium will be described. Note that, in Embodiment 2, components similar to those of Embodiment 1 are denoted by the same reference signs and points not particularly mentioned are similar to those of Embodiment 1.

Like the air-conditioning apparatus according to Embodiment 1, an air-conditioning apparatus according to Embodiment 2 is configured to, during a simultaneous cooling and heating operation, decrease a heat exchange capacity of the outdoor heat exchanger 13 so as to increase performance of at least one of the indoor heat exchangers 31 that are operating in the same operation mode as the outdoor heat exchanger 13 and configured to adjust the expansion valves 32 of the other indoor heat exchangers 31 operating in the same mode so as to decrease the flow rate of the refrigerant and consequently suppress performance from becoming excessive.

Figure 8:
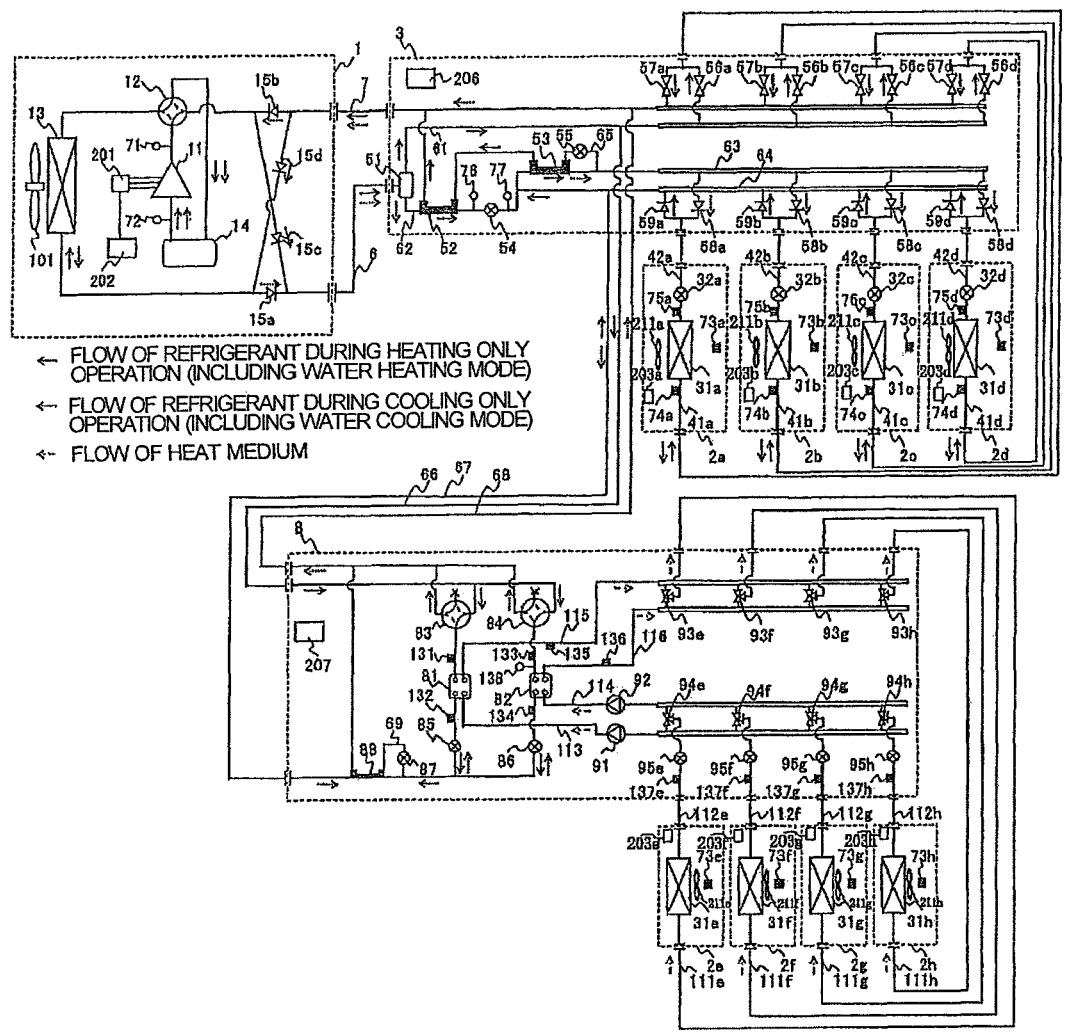
FIG. 8 is a refrigerant circuit diagram of an air-conditioning apparatus according to Embodiment 2 of the present invention.

FIG. 8 is a refrigerant circuit diagram of the air-conditioning apparatus according to Embodiment 2 of the present invention. The air-conditioning apparatus according to Embodiment 2 includes a heat medium relay unit 8 and indoor units 2e, 2f, 2g, and 2h in addition to the configuration of the air-conditioning apparatus described in Embodiment 1. This heat medium relay unit 8 includes intermediate heat exchangers 81 and 82; four-way valves 83 and 84; expansion valves 85, 86, and 87; an internal heat exchanger 88; pumps 91 and 92 serving as heat medium sending means; three-way valves 93 and 94 serving as heat medium flow switching means; flow control valves 95 serving as heat medium flow control means; and a heat medium relay unit controller 207. Also, the indoor units 2e, 2f, 2g, and 2h include indoor heat exchangers 31e, 31f, 31g, and 31h, respectively. Note that there may be any given number of heat medium relay units 8 and any given number of indoor units 2.

The heat medium relay unit 8 connects a high-pressure gas pipe 66 and the high-pressure gas pipe 61 to each other, connects a liquid pipe 67 and the liquid pipe 64 to each other, and connects a low-pressure pipe 68 and the low-pressure pipe 7 to each other, thereby being connected to the relay unit 3 by the pipes. The heat medium relay unit 8 and each indoor unit 2 (each indoor heat exchanger 31) are connected to each other by heat medium pipes 111 and 112 through which a safe heat medium such as water or antifreeze flows. That is, the heat medium relay unit 8 and each indoor unit 2 (each indoor heat exchanger 31) are connected to each other through one heat medium passage.

The indoor units 2a, 2b, 2c, and 2d are connected to the relay unit 3 by pipes, that is, the respective gas branch pipes 41 and the respective liquid branch pipes 42 which are refrigerant pipes. Therefore, the refrigerant circulates directly through the indoor heat exchangers 31a, 31b, 31c, and 31d, and cooling and heating are performed. That is, the indoor units 2a, 2b, 2c, and 2d are direct expansion indoor units. On the other hand, the indoor units 2e, 2f, 2g, and 2h are connected to the heat medium relay unit 8 by the heat medium pipes 111 and 112. Therefore, the heat medium circulates through the indoor heat exchangers 31e, 31f, 31g, and 31h, and cooling and heating are performed. That is, the indoor units 2e, 2f, 2g, and 2h are indirect indoor units.

Figure 9:
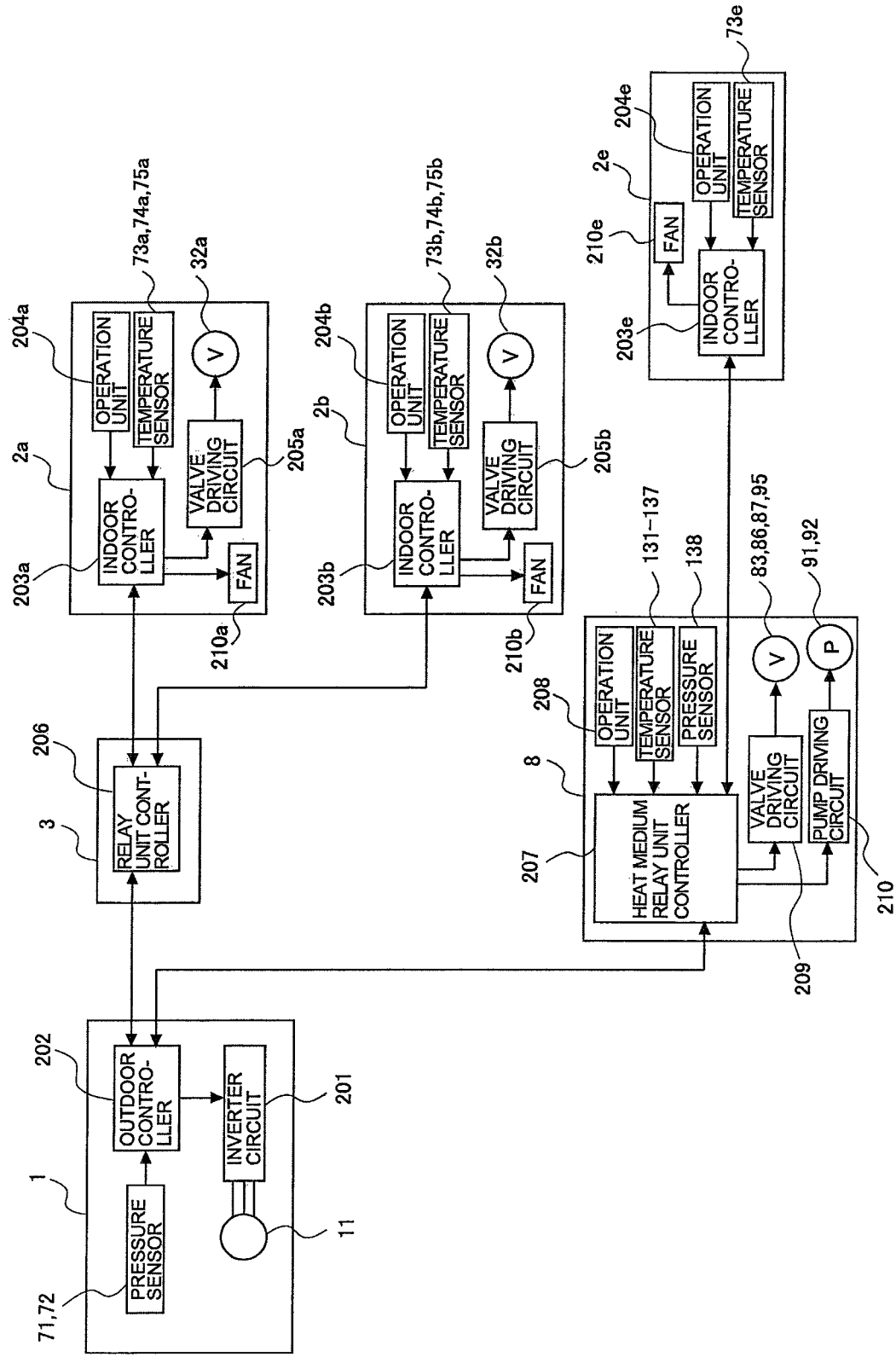
FIG. 9 is a control circuit diagram of the air-conditioning apparatus according to Embodiment 2 of the present invention.

FIG. 9 is a control circuit diagram of the air-conditioning apparatus according to Embodiment 2 of the present invention. The heat medium relay unit 8 includes the heat medium relay unit controller 207, to which a valve driving circuit 209 and a pump driving circuit 210 are connected. This heat medium relay unit controller 207 includes a microcomputer and peripheral circuits of the microcomputer, and is supplied with various control commands in form of serial signals from the outdoor controller 202.

Also, the relay unit controller 206 communicates with the indoor controllers 203a, 203b, 203c, and 203d of the indoor units 2a, 2b, 2c, and 2d connected to the relay unit 3 by pipes. The relay unit controller 206 integrates pieces of operation information of the indoor units 2a, 2b, 2c, and 2d, respectively, and communicates the resulting information to the outdoor controller 202. Further, the heat medium relay unit controller 207 communicates with indoor controllers 203e, 203f, 203g, and 203h of the indoor units 2e, 2f, 2g, and 2h connected to the heat medium relay unit 8 by pipes, respectively. The heat medium relay unit controller 207 integrates pieces of operation information of the indoor units 2e, 2f, 2g, and 2h and communicates the resulting information to the outdoor controller 202. Note that FIG. 9 only illustrates the indoor unit 2e and the indoor controller 203e thereof.

The intermediate heat exchangers 81 and 82 each include a heat transfer portion allowing the refrigerant to pass therethrough and a heat transfer portion allowing the heat medium to pass therethrough, and allow intermediate heat exchange between the refrigerant and the heat medium. Depending on the operation modes of the indoor units 2 which are indirect indoor units, the intermediate heat exchangers 81 and 82 each may function as a condenser to cause the refrigerant to transfer its heat to heat the heat medium and may function as an evaporator to cause the refrigerant to remove heat to cool the heat medium.

The pumps 91 and 92 apply pressure to the heat medium to circulate the heat medium. Here, the flow rate of the heat medium sent out (discharge flow rate) can be changed by changing the rotation speed of a motor (not illustrated) included in each of the pumps 91 and 92 within a certain range.

The three-way valves 93 each connect a heat medium pipe 115 or a heat medium pipe 116 to the heat medium pipe 111 in a switching manner. The three-way valves 94 each connect a heat medium pipe 113 or a heat medium pipe 114 to the heat medium pipe 112 in a switching manner. The flow control valves 95 each adjust the flow rate of the heat medium that flows into the corresponding indoor unit 2.

The outdoor unit and the relay unit 3 are connected to each other by the high-pressure pipe 6 and the low-pressure pipe 7 which are refrigerant pipes. Also, the relay unit 3 and the indoor units 2 are connected to each other by the gas branch pipes 41 and the liquid branch pipes 42 which are the refrigerant pipes.

The air-conditioning apparatus according to Embodiment 2 also includes various pressure sensors and temperature sensors.

A pressure sensor 138 detects a condensing pressure in the case where the intermediate heat exchangers 81 and 82 function as condensers. Note that the pressure sensor 138 may be at any position where the condensing pressure at the intermediate heat exchangers 81 and 82 is detectable. A temperature sensor 131 is installed between the four-way valve 83 and the intermediate heat exchanger 81. A temperature sensor 132 is installed between the intermediate heat exchanger 81 and the expansion valve 85. A temperature sensor 133 is installed between the four-way valve 84 and the intermediate heat exchanger 82. A temperature sensor 134 is installed between the intermediate heat exchanger 82 and the expansion valve 86. The temperature sensors 131, 132, 133, and 134 each detect a temperature of the refrigerant.

A temperature sensor 135 is installed at the heat medium pipe 115, and detects a temperature of the heat medium that flows out of the intermediate heat exchanger 81. A temperature sensor 136 is installed at the heat medium pipe 116, and detects a temperature of the heat medium that flows out of the intermediate heat exchanger 82. Each of temperature sensors 137 is installed at the corresponding heat medium pipe 112, and detects a temperature of the heat medium that flows out of the corresponding indoor unit 2 serving as an indirect indoor unit.

<Operation Modes>

Subsequently, an operation of the air-conditioning apparatus in each operation mode will be described based on the flows of the refrigerant and the heat medium. Note that because operations of the relay unit 3 and the direct expansion indoor units 2 are the same as those of Embodiment 1, operations of the heat medium relay unit 8 and the indirect indoor units 2 alone will be described. As operation modes of the heat medium relay unit 8 and the indirect indoor units 2, a water heating mode in which all the indoor units 2 perform a heating operation, a water cooling mode in which all the indoor units 2 perform a cooling operation, and a water-cooling and water-heating mixed mode in which a cooling operation and a heating operation coexist will be described.

(Water Heating Mode)

The water heating mode in which all the operation modes of the indoor units 2e, 2f, 2g, and 2h are a heating operation will be described using FIG. 8. The flow of the refrigerant is represented by solid-line arrows in the figure, and the flow of the heat medium is represented by dot-and-dash-line arrows in the figure. At this time, the four-way valve 83 is configured to connect the high-pressure gas pipe 66 and the intermediate heat exchanger 81 to each other by pipes. The four-way valve 84 is configured to connect the high-pressure gas pipe 66 and the intermediate heat exchanger 82 to each other by pipes. Each of the three-way valves 93 is configured to have an intermediate opening degree so as to allow the heat medium that flows through the heat medium pipe 115 and the heat medium that flows through the heat medium pipe 116 to be mixed and flow through the corresponding heat medium pipe 111. Each of the three-way valves 94 is configured to have an intermediate opening degree so as to allow the heat medium that flows through the corresponding heat medium pipe 112 to branch into the heat medium pipe 113 and the heat medium pipe 114.

First, the flow of the refrigerant in the refrigeration cycle will be described. The gas refrigerant that has flowed into the heat medium relay unit 8 through the high-pressure gas pipe flows into the intermediate heat exchangers 81 and 82 through the four-way valves 83 and 84, respectively. Because the intermediate heat exchangers 81 and 82 function as condensers for the refrigerant, the refrigerant that passes through the intermediate heat exchangers 81 and 82 heat the heat medium serving as a heat exchange target and liquefies (transfers its heat to the heat medium). Pressures of the liquid refrigerant that has flowed out of the intermediate heat exchangers 81 and 82 are reduced to an intermediate pressure by the expansion valves 85 and 86, respectively, and the liquid refrigerant becomes intermediate-pressure liquid refrigerant. The individual streams of the liquid refrigerant join together at the liquid pipe 67, and the resulting refrigerant flows out of the heat medium relay unit 8 and returns to the liquid pipe 64 of the relay unit 3.

Next, the flow of the heat medium in a heat medium circuit will be described. The heat medium is heated through heat exchange with the refrigerant at the intermediate heat exchangers 81 and 82. The heat medium heated at the intermediate heat exchanger 81 is sent out through the heat medium pipe 115, and the heat medium heated at the intermediate heat exchanger 82 is sent out through the heat medium pipe 116. Because the three-way valves 93 each have an intermediate opening degree, the heat medium that flows from the heat medium pipe 115 and the heat medium that flows from the heat medium pipe 116 are mixed in approximately equal proportions. The resulting heat medium flows through the corresponding heat medium pipe 111, and flows out of the heat medium relay unit 8. The heat medium that has flowed into the indoor unit 2 exchanges heat with air blown by a fan (not illustrated) at the indoor heat exchanger 31, and heats the air and its temperature decreases (its heat is transferred to the air). In this way, the indoor unit 2 performs heating.

The heat medium that has exited from the indoor unit 2 flows into the heat medium relay unit 8 through the heat medium pipe 112. The heat medium that has flowed in flows through the flow control valve 95 and is distributed to the heat medium pipe 113 and the heat medium pipe 114 by the three-way valve 94. Pressure is applied to the heat medium that flows through the heat medium pipe 113 by the pump 91, and the heat medium returns to the intermediate heat exchanger 81 again. Pressure is applied to the heat medium that flows through the heat medium pipe 114 by the pump 92, and the heat medium returns to the intermediate heat exchanger 82 again.

(Water Cooling Mode)

The water cooling mode in which all the operation modes of the indoor units 2e, 2f, 2g, and 2h are a cooling operation will be described using FIG. 8. The flow of the refrigerant is represented by dotted-line arrows in the figure, and the flow of the heat medium is represented by dot-and-dash-line arrows in the figure. At this time, the four-way valve 83 is configured to connect the low-pressure pipe 68 and the intermediate heat exchanger 81 to each other by pipes. The four-way valve 84 is configured to connect the low-pressure pipe 68 and the intermediate heat exchanger 82 to each other by pipes. Each of the three-way valves 93 is configured to have an intermediate opening degree so as to allow the heat medium that flows through the heat medium pipe 115 and the heat medium that flows through the heat medium pipe 116 to be mixed and flow through the corresponding heat medium pipe 111. Each of the three-way valves 94 is configured to have an intermediate opening degree so as to allow the heat medium that flows through the corresponding heat medium pipe 112 to branch into the heat medium pipe 113 and the heat medium pipe 114.

First, the flow of the refrigerant in the refrigerant cycle will be described. The intermediate-pressure refrigerant that has flowed into the heat medium relay unit 8 through the liquid pipe 67 passes through the internal heat exchanger 88, and pressure thereof is reduced by the expansion valves 85 and 86 and the refrigerant becomes low-temperature low-pressure two-phase gas-liquid refrigerant. The low-temperature low-pressure refrigerant flows into the intermediate heat exchangers 81 and 82. Because the intermediate heat exchangers 81 and 82 function as evaporators for the refrigerant, the refrigerant that passes through the intermediate heat exchangers 81 and 82 cools the heat medium serving as a heat exchange target (removes heat from the heat medium) and becomes gas refrigerant, and flows out. The refrigerant that has flowed out passes through the four-way valves 83 and 84 and the individual streams of the refrigerant join together at the low-pressure pipe 68, and the resulting refrigerant flows out of the heat medium relay unit 8. The refrigerant that has flowed out flows through the low-pressure pipe 7 of the relay unit 3.

Also, during this cycle, part of the refrigerant flowing through the liquid pipe 67 flows into the bypass pipe 69, pressure thereof is reduced by the expansion valve 87, and heat thereof is exchanged with the refrigerant that flows from the liquid pipe 67 to the expansion valves 85 and 86 at the internal heat exchanger 88. The refrigerant that has evaporated as a result of heat exchange at the internal heat exchanger 88 joins at the low-pressure pipe 68 the refrigerant that has evaporated at the intermediate heat exchangers 81 and 82, and the resulting refrigerant returns to the relay unit 3. On the other hand, the refrigerant that has been cooled as a result of heat exchange at the internal heat exchanger 88 and has a sufficient degree of subcooling flows into the intermediate heat exchangers 81 and 82 through the expansion valves 85 and 86, respectively.

Next, the flow of the heat medium in the heat medium circuit will be described. The heat medium is cooled through heat exchange with the refrigerant at the intermediate heat exchangers 81 and 82. The heat medium cooled at the intermediate heat exchanger 81 is sent out through the heat medium pipe 115, and the heat medium cooled at the intermediate heat exchanger 82 is sent out through the heat medium pipe 116. Because the three-way valves 93 each have an intermediate opening degree, the heat medium that flows from the heat medium pipe 115 and the heat medium that flows from the heat medium pipe 116 are mixed in approximately equal proportions. The resulting heat medium flows through the corresponding heat medium pipe 111, and flows out of the heat medium relay unit 8. The heat medium that has flowed into the indoor unit 2 exchanges heat with air blown by a fan (not illustrated) in the indoor heat exchanger 31, and cools the air and its temperature rises (heat is removed from the air). In this way, the indoor unit 2 performs cooling.

The heat medium that has exited from the indoor unit 2 flows into the heat medium relay unit 8 through the heat medium pipe 112. The heat medium that has flowed in flows through the flow control valve 95 and is distributed to the heat medium pipe 113 and the heat medium pipe 114 by the three-way valve 94. Pressure is applied to the heat medium that flows through the heat medium pipe 113 by the pump 91, and the heat medium returns to the intermediate heat exchanger 81 again. Pressure is applied to the heat medium that flows through the heat medium pipe 114 by the pump 92, and the heat medium returns to the intermediate heat exchanger 82 again.

As described above, in the heat medium relay unit 8, the refrigerant pipes of the intermediate heat exchangers 81 and 82 are connected in parallel with each other in the water heating mode and the water cooling mode.

(Water-Cooling and Water-Heating Mixed Mode)

Figure 10:
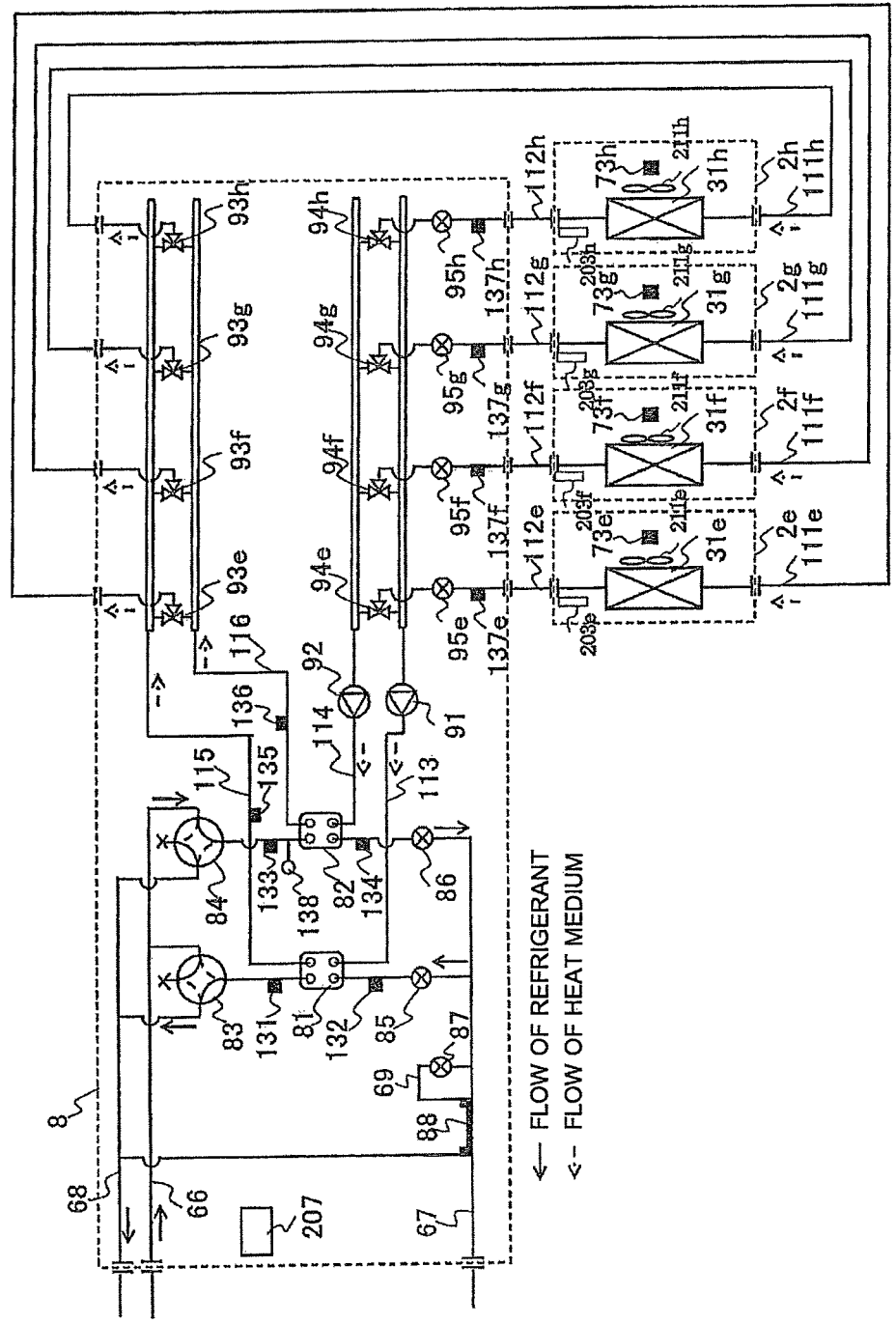
FIG. 10 is a refrigerant circuit diagram illustrating a water-cooling and water-heating mixed mode of the air-conditioning apparatus according to Embodiment 2 of the present invention.

The water-cooling and water-heating mixed mode in which operation modes of the indoor units 2e, 2f, 2g, and 2h include both a heating operation and a cooling operation will be described using FIG. 10. FIG. 10 is a refrigerant circuit diagram illustrating the water-cooling and water-heating mixed mode of the air-conditioning apparatus according to Embodiment 2. Note that the flow of the refrigerant is represented by solid-line arrows, and the flow of the heat medium is represented by dotted-line arrows. For example, the case where the indoor units 2e and 2f perform a heating operation and the indoor units 2g and 2h perform a cooling operation will be described.

At this time, the four-way valve 83 is configured to connect the low-pressure pipe 68 and the intermediate heat exchanger 81 to each other by pipes. The four-way valve 84 is configured to connect the high-pressure gas pipe 66 and the intermediate heat exchanger 82 to each other by pipes. The three-way valves 93e and 93f are configured to allow the heat medium that flows through the heat medium pipe 116 to flow through the heat medium pipes 111e and 111f, respectively. The three-way valves 93g and 93h are configured to allow the heat medium that flows through the heat medium pipe 115 to flow through the heat medium pipes 111g and 111h, respectively. The three-way valves 94e and 94f are configured to allow the heat medium that flows through the heat medium pipes 112e and 112f to flow through the heat medium pipe 114, respectively. The three-way valves 94g and 94h are configured to allow the heat medium that flows through the heat medium pipes 112g and 112h to flow through the heat medium pipe 113, respectively.

First, the flow of the refrigerant in the refrigeration cycle will be described. The gas refrigerant that has flowed into the heat medium relay unit 8 through the high-pressure gas pipe 66 flows into the intermediate heat exchanger 82 through the four-way valve 84. Pressure of the liquid refrigerant that has condensed at and has flowed out of the intermediate heat exchanger 82 is reduced to an intermediate pressure by the expansion valve 86, and the pressure of the entirety or part of the refrigerant is reduced by the expansion valve 85 so that the refrigerant becomes low-temperature low-pressure two-phase gas-liquid refrigerant. The low-temperature low-pressure refrigerant flows into the intermediate heat exchanger 81. The refrigerant that has evaporated at and has flowed out of the intermediate heat exchanger 81 flows out of the heat medium relay unit 8 through the four-way valve 83 and the low-pressure pipe 68. The refrigerant that has flowed out flows through the low-pressure pipe 7 of the relay unit 3.

Here, the flow of the intermediate-pressure liquid refrigerant at the liquid pipe 67 changes depending on the case where the heating load is larger than the cooling load and in the case where the heating load is smaller than the cooling load in the heat medium relay unit 8. First, in the case where the heating load is larger than the cooling load, the flow rate of the refrigerant related to evaporation at the intermediate heat exchanger 81 is smaller than the flow rate of refrigerant related to condensation at the intermediate heat exchanger 82. Accordingly, part of the intermediate-pressure liquid refrigerant obtained by pressure reduction by the expansion valve 86 returns to the relay unit 3 through the liquid pipe 67. On the other hand, in the case where the heating load is smaller than the cooling load, the flow rate of the refrigerant related to evaporation at the intermediate heat exchanger 81 is larger than the flow rate of refrigerant related to condensation at the intermediate heat exchanger 82. Accordingly, the liquid refrigerant that flows from the liquid pipe 67 to the heat medium relay unit 8 flows into the expansion valve 85 in addition to the intermediate-pressure liquid refrigerant obtained by pressure reduction by the expansion valve 86.

Next, the flow of the heat medium in the heat medium circuit will be described. As for the heat medium related to a heating operation, the heat medium is heated as a result of heat exchange with the refrigerant at the intermediate heat exchanger 82. The heat medium heated at the intermediate heat exchanger 82 is sent out through the heat medium pipe 116. The heat medium that flows through the heat medium pipe 116 passes through the three-way valves 93e and 93f, flows through the heat medium pipes 111e and 111f, and flows out of the heat medium relay unit 8, respectively. The heat medium that has flowed into the indoor units 2e and 2f heats air at the indoor heat exchangers 31e and 31f, respectively.

The heat medium that has exited from the indoor units 2e and 2f flows into the heat medium relay unit 8 through the heat medium pipes 112e and 112f, respectively. The heat medium that has flowed in flows through the flow control valves 95e and 95f and the three-way valves 94e and 94f, respectively, and flows into the heat medium pipe 114. Pressure is applied to the heat medium that flows through the heat medium pipe 114 by the pump 92, and the heat medium returns to the intermediate heat exchanger 82 again.

As for the heat medium related to a cooling operation, the heat medium is cooled as a result of heat exchange with the refrigerant at the intermediate heat exchanger 81. The heat medium cooled at the intermediate heat exchanger 81 is sent out through the heat medium pipe 115. The heat medium that flows through the heat medium pipe 115 passes through the three-way valves 93g and 93h, flows through the heat medium pipes 111g and 111h, and flows out of the heat medium relay unit 8, respectively. The heat medium that has flowed into the indoor units 2g and 2h cools air at the indoor heat exchangers 31g and 31h, respectively.

The heat medium that has exited from the indoor units 2g and 2h flows into the heat medium relay unit 8 through the heat medium pipes 112g and 112h, respectively. The heat medium that has flowed in flows through the flow control valves 95g and 95h and the three-way valves 94g and 94h, respectively, and flows into the heat medium pipe 113. Pressure is applied to the heat medium that flows through the heat medium pipe 113 by the pump 91, and the heat medium returns to the intermediate heat exchanger 81 again.

The operation modes of the heat medium relay unit 8 and the indirect indoor units 2 have been described above. As described in Embodiment 1, the operation mode of the entire air-conditioning apparatus is set to be a heating only operation, a cooling only operation, a heating main operation, or a cooling main operation in accordance with a balance between the heating load and the cooling load of all the indoor units 2a, 2b, 2c, 2d, 2e, 2f, 2g, and 2h.

<Actuator Control in Refrigeration Cycle (Refrigerant Passage)>

The opening degrees of the expansion valves 85 and 86 are each controlled in accordance with a command from the heat medium relay unit controller 207. Specifically, during a heating operation, the opening degrees are controlled using the degrees of subcooling of the intermediate heat exchangers 81 and 82 as target values to adjust the flow rates of the refrigerant that flows into the intermediate heat exchangers 81 and 82, respectively. A method for calculating the degree of subcooling is as described below. The condensing pressure detected by the pressure sensor 138 is converted by the heat medium relay unit controller 207 into a condensing temperature which is a saturation temperature. The heat medium relay unit controller 207 then calculates the degree of subcooling from a difference between the condensing temperature and the liquid-side temperatures of the refrigerant detected by the temperature sensors 132 and 134.

During a cooling operation, the opening degrees are controlled using the degrees of superheat of the intermediate heat exchanges 81 and 82 as target values to adjust the flow rates of the refrigerant that flows into the intermediate heat exchangers 81 and 82, respectively. The degrees of superheat are calculated by the heat medium relay unit controller 207 from differences between the gas-side temperatures of the refrigerant detected by the temperature sensors 131 and 133 and the liquid-side temperatures of the refrigerant detected by the temperature sensors 132 and 134, respectively.

<Actuator Control in Heat Medium Passage>

The opening degrees of the flow control valves 95 are each controlled in accordance with a command from the heat medium relay unit controller 207. Specifically, the opening degree is controlled using a heat medium outlet-inlet temperature difference of the indoor heat exchanger 31 as a target value to adjust the flow rate of the heat medium that flows into the indoor heat exchanger 31. The temperature at the inlet of the indoor heat exchanger 31 is an average of temperatures of the heat medium detected by the temperature sensor 135 and the temperature sensor 136 in the water heating mode and the water cooling mode.

In the water-cooling and water-heating mixed mode, the temperature of the heat medium detected by the temperature sensor 136 is used for the flow control valve 95 connected to the indoor unit 2 that performs a heating operation by pipes, whereas the temperature of the heat medium detected by the temperature sensor 135 is used for the flow control valve 95 connected to the indoor unit 2 that performs a cooling operation by pipes. As the temperature at the outlet of the indoor heat exchanger 31, the temperature of the heat medium detected by the temperature sensor 137 is used. The heat medium outlet-inlet temperature difference is calculated from a difference between the temperature at the inlet and the temperature at the outlet. The heat medium outlet-inlet temperature difference is preferably set to approximately 5 to 7 degrees C.

The rotation speeds of the pumps 91 and 92 are each controlled in accordance with a command from the heat medium relay unit controller 207. Specifically, in the water-cooling and water-heating mixed mode, the rotation speed of the pump 92 is adjusted such that the opening degree of the flow control valve 95 having the largest opening degree among the flow control valves 95 connected by pipes to the indoor units 2 that are performing a heating operation becomes maximum. For example, when the indoor units 2e and 2f are performing a heating operation, and the opening degree of the flow control valve 95e is 70% and the opening degree of the flow control valve 95f is 50% relative to the maximum opening degree value of 100%, the heat medium relay unit controller 207 determines that the total amount of circulating heat medium is excessive, and decreases the rotation speed of the pump 92 so that the opening degree of the flow control valve 95e becomes closer to a stable opening degree, that is, a range in which control of the rotation speed of the pump 92 is not performed. At this time, it is desirable that the stable opening degree of the flow control valve 95e be approximately 90 to 95%.

Also, if the opening degree of the flow control valve 95e exceeds the stable opening degree and becomes 100%, for example, the heat medium relay unit controller 207 determines that the total amount of circulating heat medium is insufficient, and increases the rotation speed of the pump 92 so that the opening degree of the flow control valve 95e becomes closer to the stable opening degree.

The similar control is performed on the pump 91 for the indoor units 2 that are performing a cooling operation. In the water heating mode and the water cooling mode, the same rotation speed is set for the pumps 91 and 92, and the similar control is performed.

As described above, a heat medium transportation power can be reduced by controlling the rotation speeds of the pumps 91 and 92 so that the opening degree of the flow control valve 95 becomes maximum. For the indoor unit 2 that is stopped, the opening degree of the flow control valve 95 is set to an opening degree that prevents the heat medium from flowing.

<Control Method for Increasing Performance of Intermediate Heat Exchanger in Water-Cooling and Water-Heating Mixed Mode>

In the air-conditioning apparatus according to Embodiment 2, heat transfer areas of the intermediate heat exchangers 81 and 82 are designed such that a total heating performance rating of the indirect indoor units 2 is achieved with both the intermediate heat exchangers 81 and 82. For example, when the condensing temperature is approximately 50 degrees C., the temperature of the heat medium at the inlet of the indoor heat exchangers 31 is approximately 45 degrees C. At this time, the indoor units 2 can achieve their heating performance ratings.

In the water-cooling and water-heating mixed mode, the heat transfer area of the intermediate heat exchanger 82 that functions as a condenser becomes approximately a half of a heat transfer area obtained in the case where both the intermediate heat exchangers 81 and 82 function as condensers in the water heating mode. That is, in the water-cooling and water-heating mixed mode, because at least one of the intermediate heat exchangers functions as an evaporator, the heat transfer area of the intermediate heat exchangers that operate as condensers decreases.

For this reason, in the cases where the heating load is large such as the case where many indoor units 2 perform a heating operation in the water-cooling and water-heating mixed mode, the heat transfer area of the intermediate heat exchanger 82 becomes small relative to the heating load. For example, while the indirect indoor units 2 are performing operation at 80% of the heating capacity rating, the heat transfer area of the intermediate heat exchanger 82 is only 50%. In such a case, the temperature of the heat medium at the inlet of the indoor heat exchanger 31 decreases, and the heating performance of the indoor unit 2 decreases.

Also, the flow rate of the heat medium sent out by the pump 92 that sends out the heat medium related to heating becomes approximately a half of that of the case where the pumps 91 and 92 send out the heat medium related to heating. That is, the number of pumps also decreases relative to the rating. Accordingly, in the cases where the heating load is large such as the case where many indoor units 2 perform a heating operation in the water-cooling and water-heating mixed mode, the water sending rate of the pump becomes small relative to the heating load.

As a result, the flow rate of the heat medium per indoor heat exchanger 31 decreases, the heat transfer performance of the indoor heat exchanger 31 drops, and the heating performance decreases. However, changing the sizes or the numbers of intermediate heat exchangers 81 and 82 and pumps 91 and 92 in case for a sufficiently large heating load not only leads to upsizing of the apparatus but also makes the apparatus costly and not economical.

Also, for example, even in the case where the heating load of the indirect indoor units 2 is sufficiently large, if the cooling load of the direct expansion indoor units 2 is larger in the entire air-conditioning apparatus, the air-conditioning apparatus is operated to perform a cooling main operation. At this time, it is difficult to make the air-conditioning apparatus perform a heating main operation in order to increase the heating performance of the indirect indoor units 2.

Accordingly, in Embodiment 2, control for increasing the performance is performed on the intermediate heat exchanger 81 or the intermediate heat exchanger 82 when the heat medium relay unit 8 and the indirect indoor units 2 are in the water-cooling and water-heating mixed mode. Here, the intermediate heat exchanger 81 or the intermediate heat exchanger 82 corresponds to the first use side heat exchanger. The direct expansion indoor heat exchangers 31a, 31b, 31c, and 31d each correspond to the second use side heat exchanger. Specific control will be described using a flowchart of FIG. 11.

Figure 11:
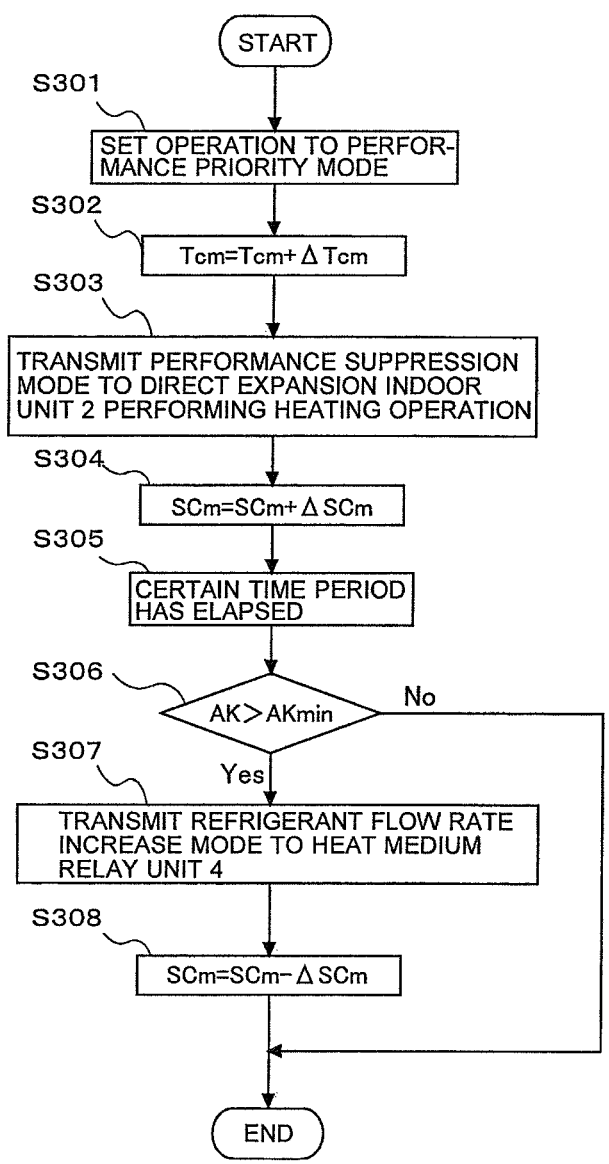
FIG. 11 is a flowchart illustrating control for increasing performance performed by the air-conditioning apparatus according to Embodiment 2 of the present invention.

FIG. 11 is a flowchart illustrating control for increasing performance performed by the air-conditioning apparatus according to Embodiment 2 of the present invention.

Upon a request to increase heating performance being sent to the heat medium relay unit controller 207 from an operation unit 208 of the heat medium relay unit 8 when the heat medium relay unit 8 and the indirect indoor units 2 are in the water-cooling and water-heating mixed mode, the heat medium relay unit controller 207 transmits performance priority to the outdoor controller 202. Upon receipt of the performance priority, the outdoor controller 202 starts the flow of FIG. 11 and sets the operation mode of the air-conditioning apparatus to a performance priority mode (step S301).

In step S302, the outdoor controller 202 increases the condensing temperature target value Tcm by ΔTcm. At this time, the heat exchange capacity AK of the outdoor heat exchanger 13 is controlled based on the condensing temperature Tc. Accordingly, if the heat exchange capacity AK is larger than the minimum heat exchange capacity AKmin, the heat exchange capacity AK decreases when the condensing temperature target value Tcm increases.

In step S303, the outdoor controller 202 transmits a heating performance suppression mode to the relay unit controller 206. The relay unit controller 206 transmits the performance suppression mode to the indoor unit 2 that is performing a heating operation among the direct expansion indoor units 2a, 2b, 2c, and 2d. The indoor controller 203 of the indoor unit 2 that has received the performance suppression mode increases the degree-of-subcooling target value SCm of the indoor heat exchanger 31 by ΔSCm in step S304. At this time, the opening degree L of the expansion valve 32 is controlled based on the calculated degree-of-subcooling value SC. Accordingly, the opening degree L decreases when the degree-of-subcooling target value SCm increases.

After the outdoor controller 202 allows a certain period to pass in step S305, the outdoor controller 202 determines whether the heat exchange capacity AK of the outdoor heat exchanger 13 is larger than the minimum heat exchange capacity AKmin in step S306. If the heat exchange capacity AK is larger than the minimum heat exchange capacity AKmin (Yes), the outdoor controller 202 transmits a refrigerant flow rate increase mode to the heat medium relay unit 8 in step S307. No that if the heat exchange capacity AK is the minimum heat exchange capacity AKmin (No) in step S306, the flow ends.

The heat medium relay unit controller 207 that has received the refrigerant flow rate increase mode decreases the degree-of-subcooling target value SCm of the intermediate heat exchanger 82 by ΔSCm in step S308. At this time, the opening degree L of the expansion valve 86 is controlled based on the calculated degree-of-subcooling value SC. Accordingly, the opening degree L increases when the degree-of-subcooling target value SCm decreases. At this point, the flow for changing the values of the condensing temperature target value Tcm and the degree-of-subcooling target value SCm ends; however, the resulting Tcm and SCm are maintained until the heating performance priority request is canceled by the operation unit 208 of the heat medium relay unit 8.

(Conditions for Heating Performance Increase Request)

As described before, the operation unit 208 makes a request to increase heating performance when the heat medium relay unit 8 and the indirect indoor units 2 are in the water-cooling and water-heating mixed mode.

Now, conditions under which the operation unit 208 makes a request to increase heating performance will be described. Conditions under which an increase in the heating performance of the intermediate heat exchanger 82 is needed include the heating capacity of the operating indirect indoor units 2 being sufficiently larger than the cooling capacity and the heating load being actually large. Accordingly, in Embodiment 2, the operation unit 208 makes determinations regarding the following three conditions to make a request to increase heating performance.

(Condition 1: Ratio between Heating Capacity and Cooling Capacity)

$$\Sigma Qh > \Sigma Qc + \alpha \tag{1}$$

Here, $\Sigma Qh$ represents the sum of capacity ratings of the indirect indoor units 2 that are performing a heating operation, $\Sigma Qc$ represents the sum of capacity ratings of the indirect indoor units 2 that are performing a cooling operation, and a represents a likelihood.

(Condition 2: Temperature of Heat Medium at Inlet of Indoor Heat Exchanger 31)

$$Twhin < Twhm - \beta \tag{2}$$

Here, Twhin represents the temperature of the heat medium at the inlet of the indoor unit 2 during heating, Twhm represents the target value of the temperature of the heat medium at the inlet of the indoor unit 2 during heating, and β represents a likelihood. In the case where the load of the indoor unit 2 that is performing a heating operation is large (sucked air temperature is low), Twhin decreases.

(Condition 3: Heat Medium Outlet-Inlet Temperature Difference, Opening Degree of Flow Control Valve, and Rotation Speed of Pump)

$$\text{``}\Delta Twhmax > \Delta Twhm + \gamma \text{'' and } L\text{max}=100\% \text{'' and}$$
$$\text{``}Fp=100\%\text{''} \tag{3}$$

Here, ΔTwhmax represents the largest value among heat medium outlet-inlet temperature differences of the indoor units 2 (more specifically, the indoor heat exchangers 31 of the indoor units 2) that are performing heating, ΔTwhm represents the target value of the heat medium outlet-inlet temperature difference of the indoor units 2 that are performing heating, and γ represents a likelihood. In the case where the heating load is large, the heat medium outlet-inlet temperature difference increases. Here, the heat medium outlet-inlet temperature difference of the indoor unit 2 that is performing heating is a value obtained by subtracting the temperature detected by the temperature sensor 137 from the temperature detected by the temperature sensor 136.

Also, L represents the opening degree of the flow control valve 95 of the indoor unit 2 that is performing heating, and Lmax represents the largest value among these opening degrees. In the case of Lmax=100%, it is indicated that the total amount of the flowing heat medium related to heating is insufficient.

Also, Fp represents the rotation speed of the pump 92. In the case where Fp is 100%, it is indicated that the total amount of the flowing heat medium related to heating is insufficient.

The above is summarized as follows. When $$\text{(Condition 1) and (Condition 2)} \tag{4}$$

or $$\text{(Condition 1) and (Condition 3)} \tag{5}$$

are satisfied for a certain period, the operation unit 208 can make a request to increase heating performance. When determination is made for these conditions, the actuators in the refrigerant passage and the heat medium passage need to be sufficiently stable, and it is desirable that the certain period be approximately 10 to 30 minutes.

<Effects of Control for Increasing Performance>

As described above, in the air-conditioning apparatus according to Embodiment 2, even in the case where the heat transfer area of the intermediate heat exchanger 82 is small, by performing control for increasing the performance when the heat medium relay unit 8 and the indirect indoor units 2 are in the water-cooling and water-heating mixed mode so as to increase the condensing temperature, the temperature of the heat medium at the inlet of the indoor unit 2 that is performing a heating operation can be increased. Accordingly, the heating performance of the indoor unit 2 can be prevented from decreasing because of a decreased heat transfer area of the intermediate heat exchanger 82.

Also, in the air-conditioning apparatus according to Embodiment 2, even in the case where the flow rate of the heat medium sent out by the pump 92 is small, by increasing the condensing temperature, the temperature of the heat medium at the inlet of the indoor unit 2 that performs a heating operation can be increased. Accordingly, a decrease in the heating performance of the indoor heat exchanger 31 due to a decrease in the flow rate of the heat medium can be compensated for by making the temperature of the heat medium at the inlet higher than that of the normal operation.

As a result, there is no need to make the intermediate heat exchanger 82 or the pump 92 larger or to increase the number of intermediate heat exchangers 82 or pumps 92 in the air-conditioning apparatus accordance to Embodiment 2, and thus the air-conditioning apparatus can be made smaller and less costly.

Also, in the air-conditioning apparatus according to Embodiment 2, because a request to increase heating performance is made when the heating load is large, control for increasing the performance is not performed unnecessarily, and the air-conditioning apparatus becomes excellent in saving energy.

Also, in the air-conditioning apparatus according to Embodiment 2, the performance of the direct expansion indoor unit 2 is suppressed when control for increasing the performance is performed on the intermediate heat exchanger 82. The refrigerant directly circulates through the direct expansion indoor heat exchanger 31 as described above, and thus the heating performance increases when the condensing temperature rises. Accordingly, by suppressing the performance, the performance of the direct expansion indoor unit 2 can be suppressed from becoming excessive.

Also, the case where control for increasing the heating performance is performed on the intermediate heat exchanger 82 during a cooling main operation in the air-conditioning apparatus according to Embodiment 2 has been described; however, control for increasing the cooling performance may be performed on the intermediate heat exchanger 81 during a heating main operation. In this case, the evaporating temperature target value Tem can be decreased by ΔTem so as to make the heat exchange capacity AK of the outdoor heat exchanger 13 smaller than the heat exchange capacity AK that allows a certain cooling performance of the refrigeration cycle to be achieved. Further, for the performance prioritized intermediate heat exchanger 81, the flow rate of the refrigerant can be increased by decreasing the degree-of-superheat target value SHm of the intermediate heat exchanger 81 by ΔSH; and the flow rate of the refrigerant can be decreased by increasing the degree-of-superheat target value SHm of the direct expansion indoor unit 2 other than the performance prioritized one by ΔSHm.

In addition, the evaporating temperature target value Tem used during a cooling operation may be set to a temperature at which the heat medium does not freeze because, if Tem is made too small, the heat medium possibly freezes at the intermediate heat exchanger 81 and the intermediate heat exchanger 81 is possibly destroyed.

In the air-conditioning apparatus according to Embodiment 1 or 2, the heating performance of a first heating use side heat exchanger is increased by adjusting the heat exchange capacity AK of the outdoor heat exchanger 13 during a cooling main operation; however, the cooling performance of at least one cooling use side heat exchanger (corresponding to a third use side heat exchanger) may be increased by adjusting a rotation speed F of the compressor 11 to decrease the evaporating temperature. At this time, the cooling performance of at least one of the other cooling use side heat exchangers (corresponding to a fourth use side heat exchanger) is suppressed from becoming excessive by decreasing the flow rate of the refrigerant.

Also, in the air-conditioning apparatus according Embodiment 1 or 2, the heating performance of at least one heating use side heat exchanger (corresponding to the third use side heat exchanger) may be increased by adjusting the rotation speed F of the compressor 11 to increase the condensing temperature during a heating main operation. At this time, the heating performance of at least one of the other heating use side heat exchangers (corresponding to the fourth use side heat exchanger) is suppressed from becoming excessive by decreasing the flow rate of the refrigerant.

Further, as for the air-conditioning apparatus according to Embodiment 1 or 2, an air-conditioning apparatus using air as a heat source has been described; however, the heat source may be water or brine. In this case, the heat exchange capacity may be controlled by adjusting the flow rate of heat source water through the rotation speed of a pump for the heat source water and the opening degree of a flow control valve, for example.

Moreover, in the air-conditioning apparatus according Embodiment 1 or 2, control for suppressing the performance of the indoor unit 2 is performed through refrigerant flow-rate control performed by the expansion valve 32; however, the performance of the indoor unit 2 may be adjusted by forcibly controlling the rotation speed of the fan 210 (indoor fan) with the indoor controller 203, for example.

In the air-conditioning apparatus according to Embodiment 1 or 2 described above, the performance of only one heat exchanger is increased; however, the number of heat exchangers whose performance is to be increased may be any given number. Also, in the air-conditioning apparatus according to Embodiment 1 or 2 described above, the flow rate of refrigerant is decreased in all heat exchangers other than the performance-increased heat exchanger; however, the present invention can be carried out as long as the flow rate of refrigerant can be decreased in at least one heat exchanger other than the performance-increased heat exchanger.

INDUSTRIAL APPLICABILITY

As application examples of the present invention, the present invention is applicable to a multi-room air-conditioning apparatus used as a multi-air-conditioning apparatus for a building or the like.

REFERENCE SIGNS LIST 1 outdoor unit, 2 indoor unit, 2a indoor unit, 2b indoor unit, 2c indoor unit, 2d indoor unit, 2e indoor unit, 2f indoor unit, 2g indoor unit, 2h indoor unit, 3 relay unit, 6 high-pressure pipe, 7 low-pressure pipe, 8 heat medium relay unit, compressor, 12 four-way valve, 13 outdoor heat exchanger, accumulator, 15a check valve, 15b check valve, 15c check valve, 15d check valve, 16 outdoor heat exchange portion, 17 outdoor heat exchange portion, 21 heat exchanger opening and closing valve, 22 heat exchanger opening and closing valve, 23 heat exchanger opening and closing valve, 24 heat exchanger opening and closing valve, 25 heat exchanger bypass valve, 26 check valve, 27 check valve, 28 check valve, 29 check valve, 31 indoor heat exchanger, 31a indoor heat exchanger, 31b indoor heat exchanger, 31c indoor heat exchanger, 31d indoor heat exchanger, 31e indoor heat exchanger, 31f indoor heat exchanger, 31g indoor heat exchanger, 31h indoor heat exchanger, 32 expansion valve, 32a expansion valve, 32c expansion valve, 32b expansion valve, 32d expansion valve, 41 gas branch pipe, 41a gas branch pipe, 41b gas branch pipe, 41c gas branch pipe, 41d gas branch pipe, 42 liquid branch pipe, 42a liquid branch pipe, 42b liquid branch pipe, 42c liquid branch pipe, 42d liquid branch pipe, 51 gas-liquid separator, 52 internal heat exchanger, 53 internal heat exchanger, 54 expansion valve, 55 expansion valve, 56 solenoid valve, 56 solenoid valve, 56a solenoid valve, 56b solenoid valve, 56c solenoid valve, 56d solenoid valve, 57 solenoid valve, 57a solenoid valve, 57b solenoid valve, 57c solenoid valve, 57d solenoid valve, 58 check valve, 58a check valve, 58b check valve, 58c check valve, 58d check valve, 59 check valve, 59a check valve, 59b check valve, 59c check valve, 59d check valve, 61 high-pressure gas pipe, 62 liquid pipe, 63 liquid pipe, 64 liquid pipe, 65 bypass pipe, 66 high-pressure gas pipe, 67 liquid pipe, 68 low-pressure pipe, 69 bypass pipe, 71 pressure sensor, 72 pressure sensor, 73 temperature sensor, 73a temperature sensor, 73b temperature sensor, 73c temperature sensor, 73d temperature sensor, 74 temperature sensor, 74a temperature sensor, 74b temperature sensor, 74c temperature sensor, 74d temperature sensor, 75 temperature sensor, 75a temperature sensor, 75b temperature sensor, 75c temperature sensor, 75d temperature sensor, 76 pressure sensor, pressure sensor, 81 intermediate heat exchanger, 82 intermediate heat exchanger, 83 four-way valve, 84 four-way valve, expansion valve, 86 expansion valve, 87 expansion valve, 88 internal heat exchanger, 91 pump, 92 pump, 93 three-way valve, 93e three-way valve, 93f three-way valve, 93g three-way valve, 93h three-way valve, 94 three-way valve, 94e three-way valve, 94f three-way valve, 94g three-way valve, 94h three-way valve, 95 flow control valve, 95e flow control valve, 95f flow control valve, 95g flow control valve, 95h flow control valve, 101 fan, 111 heat medium pipe, 112 heat medium pipe, 111e heat medium pipe, 111f heat medium pipe, 111g heat medium pipe, 111h heat medium pipe, 112 heat medium pipe, 112e heat medium pipe, 112f heat medium pipe, 112g heat medium pipe, 112h heat medium pipe, 113 heat medium pipe, 114 heat medium pipe, 115 heat medium pipe, 116 heat medium pipe, 131 temperature sensor, 132 temperature sensor, 133 temperature sensor, 134 temperature sensor, 135 temperature sensor, 136 temperature sensor, 137 temperature sensor, 138 pressure sensor, 201 inverter circuit, 202 outdoor controller, 203 indoor controller, 203a indoor controller, 203b indoor controller, 203c indoor controller, 203d indoor controller, 203e indoor controller, 203f indoor controller, 203g indoor controller, 203h indoor controller, 204 operation unit, 204a operation unit, 204b operation unit, 205 valve driving circuit, 206 relay unit controller, 207 heat medium relay unit controller, 208 operation unit, 209 valve driving circuit, 210 pump driving circuit.

The invention claimed is:

1. An air-conditioning apparatus comprising:
a compressor configured to compress a refrigerant;
a plurality of use side heat exchangers each configured to function as a condenser or an evaporator;
a plurality of expansion devices each provided for a corresponding one of the use side heat exchangers, and each configured to adjust a flow rate of the refrigerant that flows through the corresponding use side heat exchanger;
a heat source side heat exchanger configured to function as a condenser or an evaporator; and
a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein
the plurality of use side heat exchangers comprises
a first use side heat exchanger that is configured to operate in an operation mode identical to an operation mode of the heat source side heat exchanger,
a second use side heat exchanger that is different from the first use side heat exchanger and that is configured to operate in an operation mode identical to the operation mode of the heat source side heat exchanger, and
a third use side heat exchanger and a fourth use side heat exchanger that are different from the first use side heat exchanger and the second use side heat exchanger,
during an operation in which both of the third use side heat exchanger and the fourth use side heat exchanger function as condensers or evaporators, and both of the first use side heat exchanger and the second use side heat exchanger function as condensers or evaporators,
in response to a request to increase heat exchange performance from the first use side heat exchanger,
the controller
decreases the heat exchange capacity of the heat source side heat exchanger by changing a value of the saturation temperature target value of the heat source side heat exchanger, and
controls the opening degree of the expansion devices corresponding to the second use side heat exchanger to decrease a flow rate of the refrigerant that flows through the second use side heat exchanger.

2. The air-conditioning apparatus of claim 1, wherein
if the controller determines that the heat exchange capacity of the heat source side heat exchanger has not reached a lower limit after the heat exchange capacity of the heat source side heat exchanger has been decreased,
the controller
controls the opening degree of the expansion devices corresponding to the first use side heat exchanger to increase a flow rate of the refrigerant that flows through the first use side heat exchanger.

3. The air-conditioning apparatus of claim 1, wherein
when the controller increases the heat exchange performance of the first use side heat exchanger in a state where all of the heat source side heat exchanger, the first use side heat exchanger, and the second use side heat exchanger are functioning as condensers and the heat exchange capacity of the heat source side heat exchanger is controlled such that condensing saturation temperatures of the refrigerant that flows through the heat source side heat exchanger, the first use side heat exchanger, and the second use side heat exchanger become a predetermined condensing saturation temperature target value, the controller decreases the heat exchange capacity of the heat source side heat exchanger by increasing a value of the condensing saturation temperature target value.

4. The air-conditioning apparatus of claim 1, wherein when the controller increases the heat exchange performance of the first use side heat exchanger in a state where all of the heat source side heat exchanger, the first use side heat exchanger, and the second use side heat exchanger are functioning as evaporators and the heat exchange capacity of the heat source side heat exchanger is controlled such that evaporating saturation temperatures of the refrigerant that flows through the heat source side heat exchanger, the first use side heat exchanger, and the second use side heat exchanger become a predetermined evaporating saturation temperature target value, the controller decreases the heat exchange capacity of the heat source side heat exchanger by decreasing a value of the evaporating saturation temperature target value.

5. The air-conditioning apparatus of claim 3, wherein when the controller increases the heat exchange performance of the first use side heat exchanger while controlling the opening degree of the expansion devices corresponding to the first use side heat exchanger and the second use side heat exchanger that are functioning as condensers such that a degree of subcooling of the refrigerant that flows through the first use side heat exchanger and the second use side heat exchanger becomes a predetermined target degree of subcooling, the controller decreases the flow rate in the second use side heat exchanger by increasing the target degree of subcooling.

6. The air-conditioning apparatus of claim 4, wherein when the controller increases the heat exchange performance of the first use side heat exchanger while controlling the opening degree of the expansion devices corresponding to the first use side heat exchanger and the second use side heat exchanger that are functioning as evaporators such that a degree of superheat of the refrigerant that flows through the first use side heat exchanger and the second use side heat exchanger becomes a predetermined target degree of superheat, the controller decreases the flow rate in the second use side heat exchanger by increasing the target degree of superheat.

7. The air-conditioning apparatus of claim 1, further comprising:

an air-sending device configured to blow air to the heat source side heat exchanger, wherein the controller controls the heat exchange capacity of the heat source side heat exchanger with a rotation speed of the air-sending device.

8. The air-conditioning apparatus of claim 1, further comprising:

a heat exchanger opening and closing device configured to close some or all of refrigerant heat transfer pipes of the heat source side heat exchanger; and a heat exchanger bypass device configured to allow part or all of the refrigerant that flows through the heat source side heat exchanger to bypass the heat source side heat exchanger, wherein the controller controls the heat exchange capacity of the heat source side heat exchanger by opening or closing the heat exchanger opening and closing device and the heat exchanger bypass device.

9. The air-conditioning apparatus of claim 1, wherein at least one of the use side heat exchangers is an intermediate heat exchanger at which the refrigerant supplied from the heat source side heat exchanger and a heat medium different from the refrigerant exchange heat, at least one of a rest of the use side heat exchangers is a direct expansion heat exchanger at which the refrigerant supplied from the heat source side heat exchanger and indoor air exchange heat, the air-conditioning apparatus comprises at least one indirect heat exchanger which is connected to a heat medium passage of the intermediate heat exchangers and at which the heat medium and indoor air exchange heat, the first use side heat exchanger is the intermediate heat exchanger, and the second use side heat exchanger in which the flow rate of the refrigerant is decreased when the heat exchange performance of the first use side heat exchanger is increased is the direct expansion heat exchanger.

10. The air-conditioning apparatus of claim 9, wherein in a state where at least one of the intermediate heat exchangers is functioning as a condenser and at least one of the other intermediate heat exchangers is functioning as an evaporators, the first use side heat exchanger is the intermediate heat exchanger connected to the indirect heat exchanger having a larger heat exchange load, and the second use side heat exchanger in which the flow rate of the refrigerant is decreased when the heat exchange performance of the first use side heat exchanger is increased is the direct expansion heat exchanger.

11. The air-conditioning apparatus of claim 1, wherein when the heat source side heat exchanger uses water or brine as a heat source, the controller controls the heat exchange capacity of the heat source side heat exchanger by adjusting a flow rate of the water or the brine.

12. The air-conditioning apparatus of claim 1, further comprising:

an air-sending device configured to blow air to the second use side heat exchanger, wherein when the controller increases the heat exchange performance of the first use side heat exchanger, the controller decreases a heat exchange capacity of the second use side heat exchanger by decreasing a rotation speed of the air-sending device for the second use side heat exchanger.

13. The air-conditioning apparatus of claim 3, wherein in an operation mode in which the first use side heat exchanger and the second use side heat exchanger function as condensers and in which the third use side heat exchanger and the fourth use side heat exchanger function as evaporators, the controller is configured to control an operation capacity of the compressor such that an evaporating saturation temperature of the refrigerant that flows through the third use side heat exchanger and the fourth use side heat exchanger becomes a predetermined evaporating saturation temperature target value, and in response to a request to increase heat exchange performance from the third use side heat exchanger, the controller increases the operation capacity of the compressor by decreasing a value of the evaporating saturation temperature target value, and controls the opening degree of the expansion devices corresponding to the fourth use side heat exchanger to decrease a flow rate of the refrigerant that flows through the fourth use side heat exchanger.

14. The air-conditioning apparatus of claim 4, wherein in an operation mode in which the first use side heat exchanger and the second use side heat exchanger function as evaporators and in which the third use side heat exchanger and the fourth use side heat exchanger function as condensers, the controller is configured to control an operation capacity of the compressor such that a condensing saturation temperature of the refrigerant that flows through the third use side heat exchanger and the fourth use side heat exchanger becomes a predetermined condensing saturation temperature target value, and in response to a request to increase heat exchange performance from the third use side heat exchanger, the controller increases the operation capacity of the compressor by increasing a value of the condensing saturation temperature target value, and controls the opening degree of the expansion devices corresponding to the fourth use side heat exchanger to decrease a flow rate of the refrigerant that flows through the fourth use side heat exchanger.

15. An air-conditioning apparatus comprising:

a compressor configured to compress a refrigerant;

a plurality of use side heat exchangers each configured to function as a condenser or an evaporator;

a plurality of expansion devices each provided for a corresponding one of the use side heat exchangers, and each configured to adjust a flow rate of the refrigerant that flows through the corresponding use side heat exchanger;

a heat source side heat exchanger configured to function as a condenser or an evaporator; and a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein the plurality of use side heat exchangers comprises a first use side heat exchanger that is configured to operate in an operation mode identical to an operation mode of the heat source side heat exchanger, a second use side heat exchanger that is different from the first use side heat exchanger and that is configured to operate in an operation mode identical to the operation mode of the heat source side heat exchanger, and a third use side heat exchanger and a fourth use side heat exchanger that are different from the first use side heat exchanger and the second use side heat exchanger, during an operation in which both of the third use side heat exchanger and the fourth use side heat exchanger function as condensers or evaporators, and both of the first use side heat exchanger and the second use side heat exchanger function as condensers or evaporators, in response to a request to increase heat exchange performance from the first use side heat exchanger, the controller decreases the heat exchange capacity of the heat source side heat exchanger by changing a value of the saturation temperature target value of the heat source side heat exchanger, controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased, the controller controls the opening degree of the expansion devices corresponding to the first use side heat exchanger to increase a flow rate of the refrigerant that flows through the first use side heat exchanger, and when the controller increases the heat exchange performance of the first use side heat exchanger in a state where all of the heat source side heat exchanger, the first use side heat exchanger, and the second use side heat exchanger are functioning as condensers and the heat exchange capacity of the heat source side heat exchanger is controlled such that condensing saturation temperatures of the refrigerant that flows through the heat source side heat exchanger, the first use side heat exchanger, and the second use side heat exchanger become a predetermined condensing saturation temperature target value, the controller decreases the heat exchange capacity of the heat source side heat exchanger by increasing a value of the condensing saturation temperature target value.

16. An air-conditioning apparatus comprising:

a compressor configured to compress a refrigerant;

a plurality of use side heat exchangers each configured to function as a condenser or an evaporator;

a plurality of expansion devices each provided for a corresponding one of the use side heat exchangers, and each configured to adjust a flow rate of the refrigerant that flows through the corresponding use side heat exchanger;

a heat source side heat exchanger configured to function as a condenser or an evaporator; and a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein the plurality of use side heat exchangers comprises a first use side heat exchanger that is configured to operate in an operation mode identical to an operation mode of the heat source side heat exchanger, a second use side heat exchanger that is different from the first use side heat exchanger and that is configured to operate in an operation mode identical to the operation mode of the heat source side heat exchanger, and a third use side heat exchanger and a fourth use side heat exchanger that are different from the first use side heat exchanger and the second use side heat exchanger, during an operation in which both of the third use side heat exchanger and the fourth use side heat exchanger function as condensers or evaporators, and both of the first use side heat exchanger and the second use side heat exchanger function as condensers or evaporators, in response to a request to increase heat exchange performance from the first use side heat exchanger, the controller decreases the heat exchange capacity of the heat source side heat exchanger by changing a value of the saturation temperature target value of the heat source side heat exchanger, controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased, the controller controls the opening degree of the expansion devices corresponding to the first use side heat exchanger to increase a flow rate of the refrigerant that flows through the first use side heat exchanger, and when the controller increases the heat exchange performance of the first use side heat exchanger in a state where all of the heat source side heat exchanger, the first use side heat exchanger, and the second use side heat exchanger are functioning as evaporators and the heat exchange capacity of the heat source side heat exchanger is controlled such that evaporating saturation temperatures of the refrigerant that flows through the heat source side heat exchanger, the first use side heat exchanger, and the second use side heat exchanger become a predetermined evaporating saturation temperature target value, the controller decreases the heat exchange capacity of the heat source side heat exchanger by decreasing a value of the evaporating saturation temperature target value.

17. An air-conditioning apparatus comprising:
a compressor configured to compress a refrigerant;
a plurality of use side heat exchangers each configured to function as a condenser or an evaporator;
a plurality of expansion devices each provided for a corresponding one of the use side heat exchangers, and each configured to adjust a flow rate of the refrigerant that flows through the corresponding use side heat exchanger;
a heat source side heat exchanger configured to function as a condenser or an evaporator;
a controller configured to control opening degrees of the plurality of expansion devices, and a heat exchange capacity of the heat source side heat exchanger such that a saturation temperature at which the refrigerant condenses or evaporates becomes a predetermined saturation temperature target value; and an air-sending device configured to blow air to the heat source side heat exchanger, wherein the plurality of use side heat exchangers comprises
a first use side heat exchanger that is configured to operate in an operation mode identical to an operation mode of the heat source side heat exchanger, a second use side heat exchanger that is different from the first use side heat exchanger and that is configured to operate in an operation mode identical to the operation mode of the heat source side heat exchanger, and a third use side heat exchanger and a fourth use side heat exchanger that are different from the first use side heat exchanger and the second use side heat exchanger, during an operation in which both of the third use side heat exchanger and the fourth use side heat exchanger function as condensers or evaporators, and both of the first use side heat exchanger and the second use side heat exchanger function as condensers or evaporators, in response to a request to increase heat exchange performance from the first use side heat exchanger, the controller decreases the heat exchange capacity of the heat source side heat exchanger by changing a value of the saturation temperature target value of the heat source side heat exchanger, controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased, the controller controls the opening degree of the expansion devices corresponding to the first use side heat exchanger to increase a flow rate of the refrigerant that flows through the first use side heat exchanger, and controls the heat exchange capacity of the heat source side heat exchanger with a rotation speed of the air-sending device.

18. An air-conditioning apparatus comprising:
a compressor configured to compress a refrigerant;
a plurality of use side heat exchangers each configured to function as a condenser or an evaporator;
a plurality of expansion devices each provided for a corresponding one of the use side heat exchangers, and each configured to adjust a flow rate of the refrigerant that flows through the corresponding use side heat exchanger;
a heat source side heat exchanger configured to function as a condenser or an evaporator;
a controller configured to control opening degrees of the plurality of expansion devices, and a heat exchange capacity of the heat source side heat exchanger such that a saturation temperature at which the refrigerant condenses or evaporates becomes a predetermined saturation temperature target value;
a heat exchanger opening and closing device configured to close some or all of refrigerant heat transfer pipes of the heat source side heat exchanger; and
a heat exchanger bypass device configured to allow part or all of the refrigerant that flows through the heat source side heat exchanger to bypass the heat source side heat exchanger, wherein
the plurality of use side heat exchangers comprises
  a first use side heat exchanger that is configured to operate in an operation mode identical to an operation mode of the heat source side heat exchanger,
  a second use side heat exchanger that is different from the first use side heat exchanger and that is configured to operate in an operation mode identical to the operation mode of the heat source side heat exchanger, and
  a third use side heat exchanger and a fourth use side heat exchanger that are different from the first use side heat exchanger and the second use side heat exchanger,
during an operation in which both of the third use side heat exchanger and the fourth use side heat exchanger function as condensers or evaporators, and both of the first use side heat exchanger and the second use side heat exchanger function as condensers or evaporators,
in response to a request to increase heat exchange performance from the first use side heat exchanger,
the controller
decreases the heat exchange capacity of the heat source side heat exchanger by changing a value of the saturation temperature target value of the heat source side heat exchanger,
controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased,
the controller
controls the opening degree of the expansion devices corresponding to the first use side heat exchanger to increase a flow rate of the refrigerant that flows through the first use side heat exchanger, and
controls the heat exchange capacity of the heat source side heat exchanger by opening or closing the heat exchanger opening and closing device and the heat exchanger bypass device.

19. An air-conditioning apparatus comprising:
a compressor configured to compress a refrigerant;
a plurality of use side heat exchangers each configured to function as a condenser or an evaporator;
a plurality of expansion devices each provided for a corresponding one of the use side heat exchangers, and each configured to adjust a flow rate of the refrigerant that flows through the corresponding use side heat exchanger;
a heat source side heat exchanger configured to function as a condenser or an evaporator; and
a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein
the plurality of use side heat exchangers comprises
  a first use side heat exchanger that is configured to operation in an operation mode identical to an operation mode of the heat source side heat exchanger,
  a second use side heat exchanger that is different from the first use side heat exchanger and that is configured to operation in an operation mode identical to the operation mode of the heat source side heat exchanger, and
  a third use side heat exchanger and a fourth use side heat exchanger that are different from the first use side heat exchanger and the second use side heat exchanger,
during an operation in which both of the third use side heat exchanger and the fourth use side heat exchanger function as condensers or evaporators, and both of the first use side heat exchanger and the second use side heat exchanger function as condensers or evaporators,
in response to a request to increase heat exchange performance from the first use side heat exchanger,
the controller
decreases the heat exchange capacity of the heat source side heat exchanger by changing a value of the saturation temperature target value of the heat source side heat exchanger,
controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased,
the controller
controls the opening degree of the expansion devices corresponding to the first use side heat exchanger to increase a flow rate of the refrigerant that flows through the first use side heat exchanger,
at least one of the use side heat exchangers is an intermediate heat exchanger at which the refrigerant supplied from the heat source side heat exchanger and a heat medium different from the refrigerant exchange heat,
at least one of a rest of the use side heat exchangers is a direct expansion heat exchanger at which the refrigerant supplied from the heat source side heat exchanger and indoor air exchange heat,
the air-conditioning apparatus comprises at least one indirect heat exchanger which is connected to a heat medium passage of the intermediate heat exchangers and at which the heat medium and indoor air exchange heat,
the first use side heat exchanger is the intermediate heat exchanger, and
the second use side heat exchanger in which the flow rate of the refrigerant is decreased when the heat exchange performance of the first use side heat exchanger is increased is the direct expansion heat exchanger.

20. An air-conditioning apparatus comprising:
a compressor configured to compress a refrigerant;
a plurality of use side heat exchangers each configured to function as a condenser or an evaporator;
a plurality of expansion devices each provided for a corresponding one of the use side heat exchangers, and each configured to adjust a flow rate of the refrigerant that flows through the corresponding use side heat exchanger;
a heat source side heat exchanger configured to function as a condenser or an evaporator; and
a controller configured to control opening degrees of the plurality of expansion devices, and a heat exchange capacity of the heat source side heat exchanger such that a saturation temperature at which the refrigerant condenses or evaporates becomes a predetermined saturation temperature target value, wherein the plurality of use side heat exchangers comprises
- a first use side heat exchanger that is configured to operation in an operation mode identical to an operation mode of the heat source side heat exchanger,
- a second use side heat exchanger that is different from the first use side heat exchanger and that is configured to operation in an operation mode identical to the operation mode of the heat source side heat exchanger, and
- a third use side heat exchanger and a fourth use side heat exchanger that are different from the first use side heat exchanger and the second use side heat exchanger, during an operation in which both of the third use side heat exchanger and the fourth use side heat exchanger function as condensers or evaporators, and both of the first use side heat exchanger and the second use side heat exchanger function as condensers or evaporators, in response to a request to increase heat exchange performance from the first use side heat exchanger, the controller decreases the heat exchange capacity of the heat source side heat exchanger by changing a value of the saturation temperature target value of the heat source side heat exchanger, controls the opening degree of the expansion devices corresponding to the second use side heat exchanger to decrease a flow rate of the refrigerant that flows through the second use side heat exchanger, if the controller determines that the heat exchange capacity of the heat source side heat exchanger has not reached a lower limit after the heat exchange capacity of the heat source side heat exchanger has been decreased, the controller controls the opening degree of the expansion devices corresponding to the first use side heat exchanger to increase a flow rate of the refrigerant that flows through the first use side heat exchanger, at least one of the use side heat exchangers is an intermediate heat exchanger at which the refrigerant supplied from the heat source side heat exchanger and a heat medium different from the refrigerant exchange heat, at least one of a rest of the use side heat exchangers is a direct expansion heat exchanger at which the refrigerant supplied from the heat source side heat exchanger and indoor air exchange heat, the air-conditioning apparatus comprises at least one indirect heat exchanger which is connected to a heat medium passage of the intermediate heat exchangers and at which the heat medium and indoor air exchange heat, in a state where at least one of the intermediate heat exchangers is functioning as a condenser and at least one of the other intermediate heat exchangers is functioning as an evaporator, the first use side heat exchanger is the intermediate heat exchanger connected to the indirect heat exchanger having a larger heat exchange load, and the second use side heat exchanger in which the flow rate of the refrigerant is decreased when the heat exchange performance of the first use side heat exchanger is increased is the direct expansion heat exchanger.

* * * * *